United States Patent
Kelly et al.

(10) Patent No.: US 9,728,032 B2
(45) Date of Patent: Aug. 8, 2017

(54) GENERATING AUTO-STEREO GAMING IMAGES WITH DEGREES OF PARALLAX EFFECT ACCORDING TO PLAYER POSITION

(71) Applicant: BALLY GAMING, INC., Las Vegas, NV (US)

(72) Inventors: Bryan M. Kelly, Alamo, CA (US); Stephen Patton, Reno, NV (US); Sean Martin, Reno, NV (US); Martin Lyons, Las Vegas, NV (US); Rod Ang, Las Vegas, NV (US); Randy Hedrick, Reno, NV (US)

(73) Assignee: BALLY GAMING, INC., Las Vegas, NV (US)

( * ) Notice: Subject to any disclaimer, the term of this patent is extended or adjusted under 35 U.S.C. 154(b) by 442 days.

(21) Appl. No.: 14/262,407

(22) Filed: Apr. 25, 2014

(65) Prior Publication Data

US 2014/0235342 A1 Aug. 21, 2014
US 2017/0189796 A9 Jul. 6, 2017

Related U.S. Application Data

(63) Continuation of application No. 13/311,000, filed on Dec. 5, 2011, now Pat. No. 8,721,427.

(60) Provisional application No. 61/540,659, filed on Sep. 29, 2011, provisional application No. 61/422,753, filed on Dec. 14, 2010.

(51) Int. Cl.
*A63F 13/00* (2014.01)
*G07F 17/34* (2006.01)
*G07F 17/32* (2006.01)

(52) U.S. Cl.
CPC .......... *G07F 17/3213* (2013.01); *A63F 13/00* (2013.01); *G07F 17/3211* (2013.01); *G07F 17/3267* (2013.01); *G07F 17/34* (2013.01); *A63F 2300/1087* (2013.01); *A63F 2300/6661* (2013.01)

(58) Field of Classification Search
None
See application file for complete search history.

(56) References Cited

U.S. PATENT DOCUMENTS

| | | | |
|---|---|---|---|
| 6,089,977 A | 7/2000 | Bennett |
| 6,811,482 B2 | 11/2004 | Letovsky |
| 6,887,157 B2 | 5/2005 | LeMay et al. |
| 6,908,381 B2 | 6/2005 | Ellis |

(Continued)

FOREIGN PATENT DOCUMENTS

| | | |
|---|---|---|
| EP | 727245 | 5/2000 |
| EP | 2082381 | 7/2009 |

(Continued)

OTHER PUBLICATIONS

"U.S. Appl. No. 14/262,425 Final Office Action", Mar. 10, 2017, 22 pages.

(Continued)

*Primary Examiner* — Milap Shah
*Assistant Examiner* — Robert T Clarke, Jr.
(74) *Attorney, Agent, or Firm* — DeLizio Law, PLLC

(57) ABSTRACT

Gaming devices and methods are set forth which provide for face or body tracking to generate content concurrently displayed with several degrees of the motion parallax effect.

18 Claims, 25 Drawing Sheets

(56) References Cited

U.S. PATENT DOCUMENTS

| | | |
|---|---|---|
| 7,128,647 B2 | 10/2006 | Muir |
| 7,311,607 B2 | 12/2007 | Tedsen et al. |
| 7,367,885 B2 | 5/2008 | Escalera et al. |
| 7,841,944 B2 | 11/2010 | Wells |
| 7,857,700 B2 | 12/2010 | Wilder et al. |
| 7,874,900 B2 | 1/2011 | Ward et al. |
| 7,878,910 B2 | 2/2011 | Wells |
| 7,909,696 B2 | 3/2011 | Beaulieu et al. |
| 7,918,730 B2 | 4/2011 | Brosnan et al. |
| 7,951,001 B2 | 5/2011 | Wells |
| 8,002,623 B2 | 8/2011 | Resnick et al. |
| 8,029,350 B2 | 10/2011 | Pacey |
| 8,077,195 B2 | 12/2011 | Grossmann |
| 8,096,878 B2 | 1/2012 | Durham et al. |
| 8,118,674 B2 | 2/2012 | Burak et al. |
| 8,182,339 B2 | 5/2012 | Anderson et al. |
| 8,210,922 B2 | 7/2012 | Williams et al. |
| 8,267,767 B2 | 9/2012 | Kryuchkov et al. |
| 8,384,710 B2 | 2/2013 | Schlottmann et al. |
| 8,454,428 B2 | 6/2013 | Pacey et al. |
| 8,628,399 B2 | 1/2014 | Aoki et al. |
| 8,628,415 B2 | 1/2014 | Johnson et al. |
| 8,690,671 B2 | 4/2014 | Kaufman |
| 8,715,055 B2 | 5/2014 | Dixon |
| 8,721,427 B2 | 5/2014 | Kelly et al. |
| 8,784,206 B1 | 7/2014 | Gronkowski et al. |
| 8,968,092 B2 | 3/2015 | Gomez et al. |
| 8,979,634 B2 | 3/2015 | Pacey et al. |
| 9,007,367 B2 | 4/2015 | Aponte et al. |
| 9,128,293 B2 | 9/2015 | Ohta |
| 9,168,454 B2 | 10/2015 | Manning et al. |
| 9,619,961 B2 | 4/2017 | Collette et al. |
| 2004/0077401 A1 | 4/2004 | Schlottmann |
| 2004/0077404 A1 | 4/2004 | Schlottmann et al. |
| 2004/0102244 A1 | 5/2004 | Kryuchkov et al. |
| 2004/0192430 A1 | 9/2004 | Burak et al. |
| 2005/0037843 A1 | 2/2005 | Wells et al. |
| 2005/0104290 A1 | 5/2005 | Grauzer et al. |
| 2005/0288092 A1 | 12/2005 | Ellis |
| 2006/0023197 A1 | 2/2006 | Joel |
| 2006/0136544 A1 | 6/2006 | Atsmon et al. |
| 2006/0148553 A1 | 7/2006 | Dodge |
| 2007/0015565 A1 | 1/2007 | Chan |
| 2007/0041095 A1 | 2/2007 | Nakaya et al. |
| 2007/0117626 A1 | 5/2007 | Castellari |
| 2007/0154082 A1 | 7/2007 | Rhodes |
| 2007/0281780 A1 | 12/2007 | Aida |
| 2008/0108413 A1* | 5/2008 | Gelber ............... G07F 17/34 463/20 |
| 2008/0113745 A1 | 5/2008 | Williams et al. |
| 2008/0194320 A1 | 8/2008 | Walsh et al. |
| 2008/0220850 A1 | 9/2008 | Pacey |
| 2009/0124379 A1 | 5/2009 | Wells |
| 2009/0181755 A1* | 7/2009 | Gagner ............. G07F 17/3202 463/20 |
| 2009/0181769 A1 | 7/2009 | Thomas et al. |
| 2009/0291731 A1 | 11/2009 | Jaffe et al. |
| 2009/0298568 A1 | 12/2009 | Pacey et al. |
| 2010/0234094 A1 | 9/2010 | Gagner et al. |
| 2010/0279755 A1 | 11/2010 | Pacey et al. |
| 2011/0032252 A1 | 2/2011 | Ohta |
| 2011/0045891 A1 | 2/2011 | Ansari |
| 2011/0115880 A1 | 5/2011 | Yoo et al. |
| 2011/0201404 A1 | 8/2011 | Wells |
| 2011/0256921 A1 | 10/2011 | Pacey et al. |
| 2012/0172119 A1 | 7/2012 | Kelly et al. |
| 2013/0165205 A1 | 6/2013 | Collette et al. |
| 2013/0184064 A1 | 7/2013 | Manning et al. |
| 2013/0267317 A1 | 10/2013 | Aoki et al. |
| 2013/0331184 A1 | 12/2013 | Kelly et al. |
| 2014/0057696 A1 | 2/2014 | Chen et al. |
| 2014/0066178 A1 | 3/2014 | Kelly |
| 2014/0073386 A1 | 3/2014 | Aoki et al. |
| 2014/0121015 A1 | 5/2014 | Massing et al. |
| 2014/0235343 A1 | 8/2014 | Kelly et al. |
| 2014/0235344 A1 | 8/2014 | Kelly et al. |
| 2014/0235345 A1 | 8/2014 | Kelly et al. |
| 2014/0295970 A1 | 10/2014 | Gronkowski et al. |
| 2015/0024846 A1 | 1/2015 | Gomez et al. |
| 2015/0213675 A1 | 7/2015 | Aponte et al. |
| 2016/0042589 A1 | 2/2016 | Manning et al. |
| 2016/0098889 A1 | 4/2016 | Kelly et al. |
| 2016/0110948 A1 | 4/2016 | Collette et al. |
| 2016/0110949 A1 | 4/2016 | Collette et al. |
| 2016/0110950 A1 | 4/2016 | Collette et al. |

FOREIGN PATENT DOCUMENTS

| | | |
|---|---|---|
| WO | 2006039257 | 4/2006 |
| WO | 2006039324 | 4/2006 |
| WO | 2006039348 | 4/2006 |
| WO | 2006039371 | 4/2006 |
| WO | 2007021559 | 2/2007 |
| WO | 2007021560 | 2/2007 |
| WO | 2007032878 | 3/2007 |
| WO | 2008079542 | 7/2008 |
| WO | 2012056636 | 5/2012 |
| WO | 2012065146 | 5/2012 |

OTHER PUBLICATIONS

"U.S. Appl. No. 14/262,444 Final Office Action", Mar. 9, 2017, 24 pages.
"U.S. Appl. No. 14/977,233 Final Office Action", Feb. 10, 2017, 26 pages.
"U.S. Appl. No. 14/977,245 Final Office Action", Jan. 13, 2017, 37 pages.
"PCT Application No. PCT/US11/60497 International Preliminary Report on Patentability", Nov. 11, 2013, 4 pages.
"PCT Application No. PCT/US11/60497 International Search Report", May 25, 2012, 9 pages.
"U.S. Appl. No. 13/311,000 Office Action", Aug. 5, 2013, 11 pages.
"U.S. Appl. No. 13/722,468 Final Office Action", Jul. 15, 2016, 26 pages.
"U.S. Appl. No. 13/722,468 Office Action", Jan. 12, 2016, 21 pages.
"U.S. Appl. No. 13/822,621 Office Action", Jan. 22, 2015, 7 Pages.
"U.S. Appl. No. 14/262,425 Office Action", Aug. 29, 2016, 19 pages.
"U.S. Appl. No. 14/262,434 Office Action", Sep. 20, 2016, 21 pages.
"U.S. Appl. No. 14/262,444 Office Action", Aug. 26, 2016, 15 pages.
"U.S. Appl. No. 14/920,434 Office Action", Jun. 13, 2016, 11 pages.
"U.S. Appl. No. 14/965,067 Final Office Action", Oct. 11, 2016, 20 pages.
"U.S. Appl. No. 14/965,067 Office Action", Mar. 25, 2016, 20 pages.
"U.S. Appl. No. 14/977,223 Office Action", Jul. 5, 2016, 20 pages.
"U.S. Appl. No. 14/977,233 Office Action", Jul. 29, 2016, 19 pages.
"U.S. Appl. No. 14/977,245 Office Action", Jul. 11, 2016, 17 pages.
Co-Pending U.S. Appl. No. 13/722,468, filed Dec. 20, 2012, 51 pages.
Co-Pending U.S. Appl. No. 14/262,425, filed Apr. 25, 2014, 68 pages.
Co-Pending U.S. Appl. No. 14/965,067, filed Dec. 10, 2015, 47 pages.
Co-Pending U.S. Appl. No. 14/262,434, filed Apr. 25, 2014, 69 pages.
Co-Pending U.S. Appl. No. 14/262,444, filed Apr. 25, 2014, 68 pages.
Co-Pending U.S. Appl. No. 14/920,434, filed Oct. 22, 2015, 51 pages.
Co-Pending U.S. Appl. No. 14/977,223, filed Dec. 21, 2015, 48 pages.
Co-Pending U.S. Appl. No. 14/977,233, filed Dec. 21, 2015, 50 pages.
Co-Pending U.S. Appl. No. 14/977,245, filed Dec. 21, 2015, 45 pages.

* cited by examiner

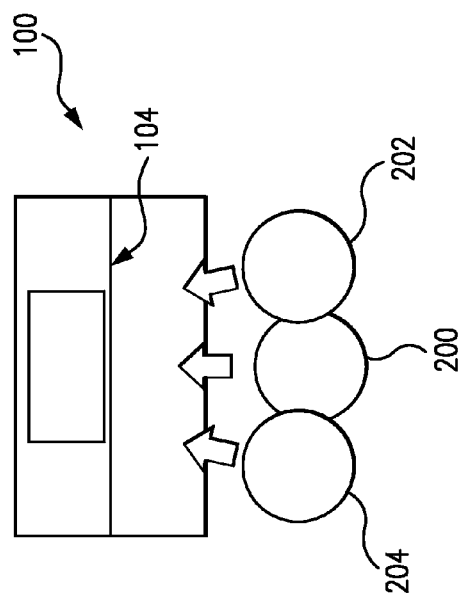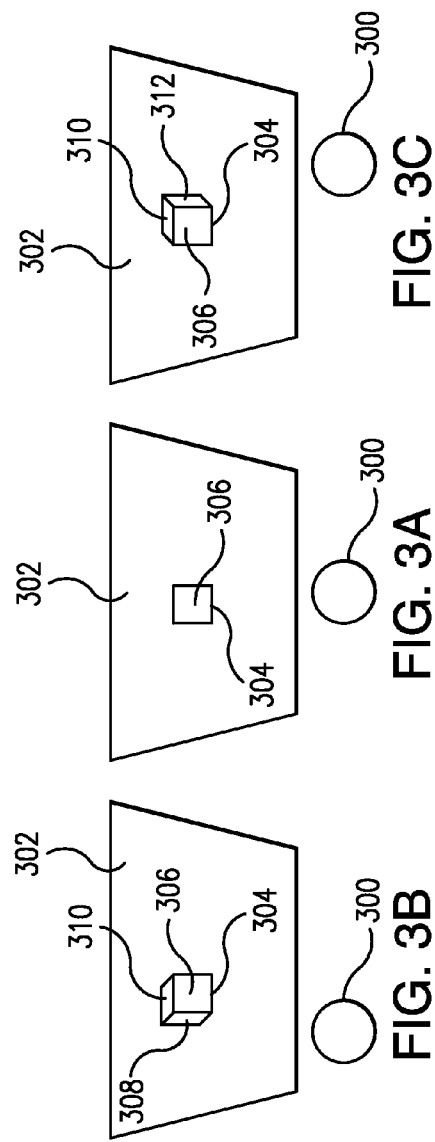

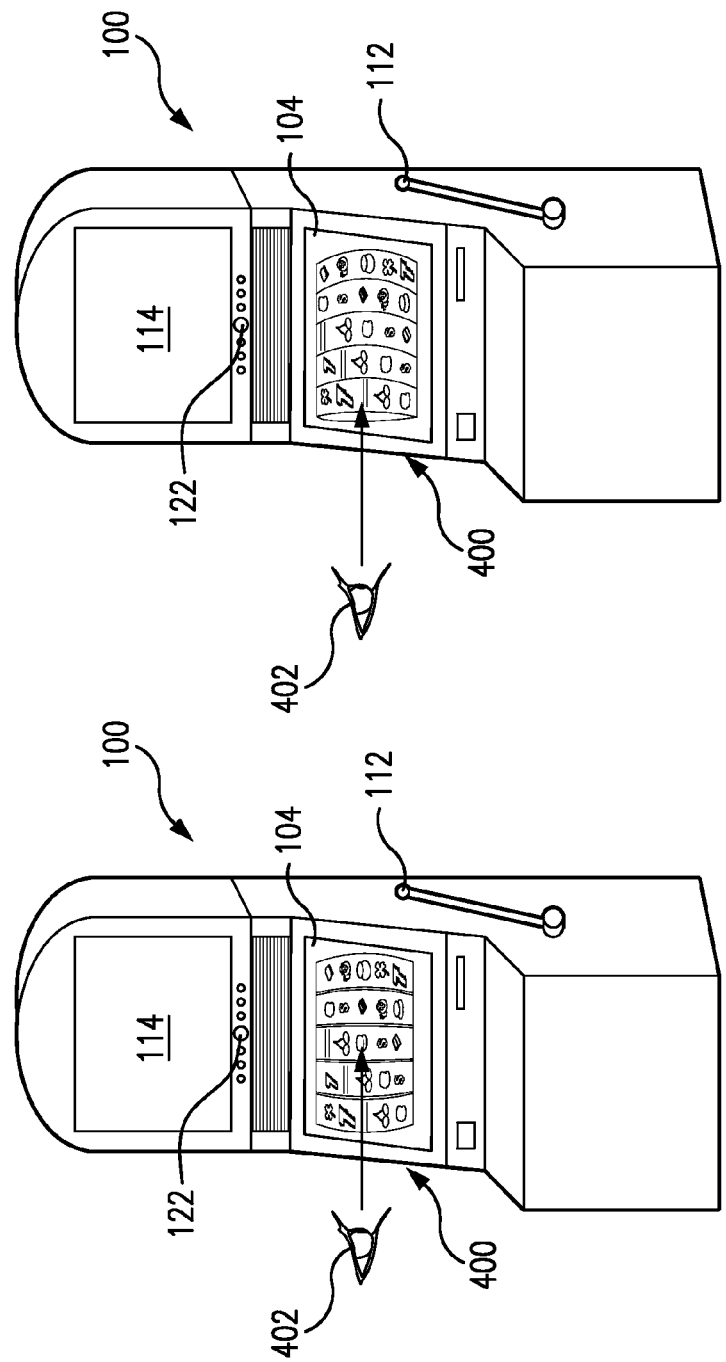

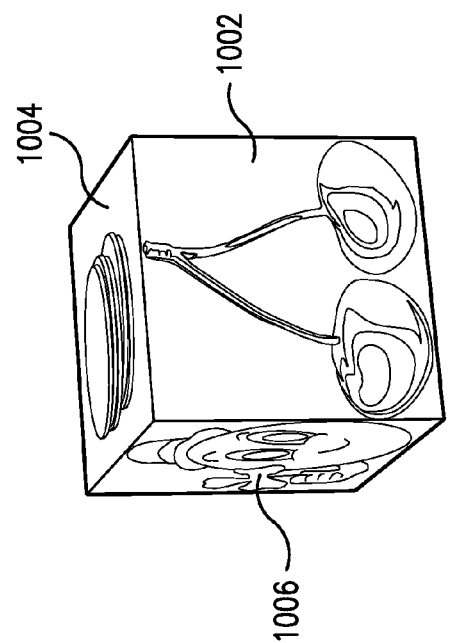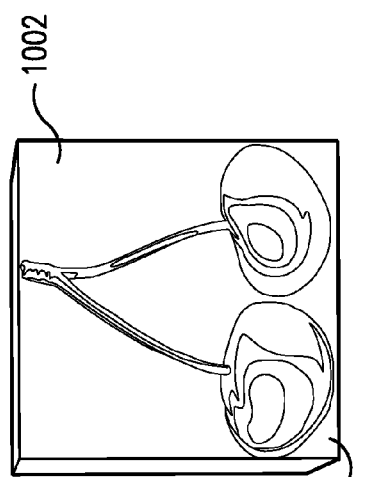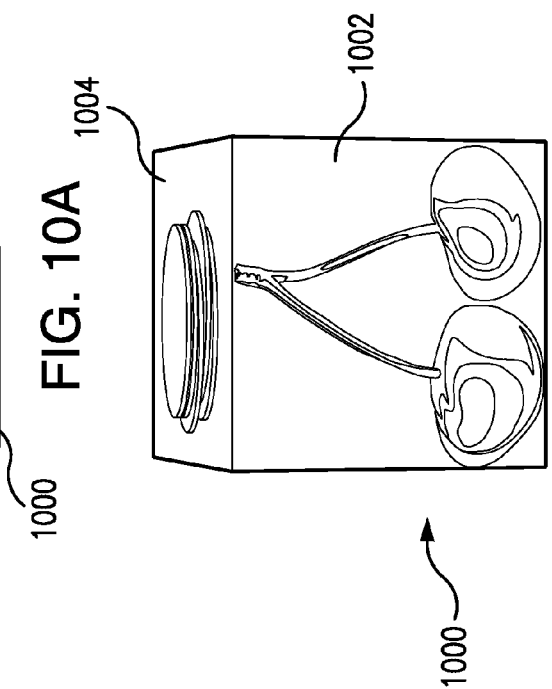

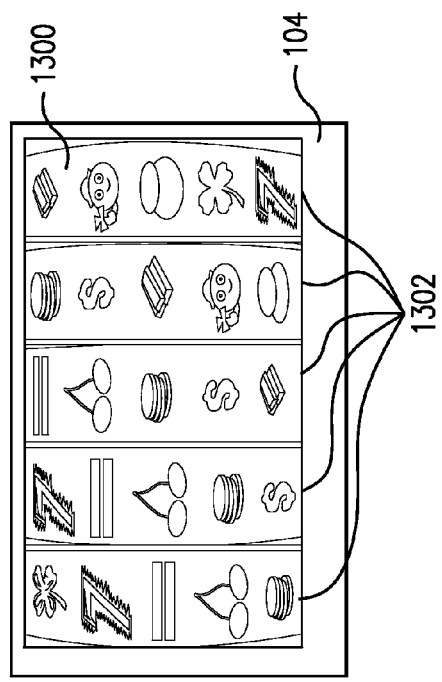
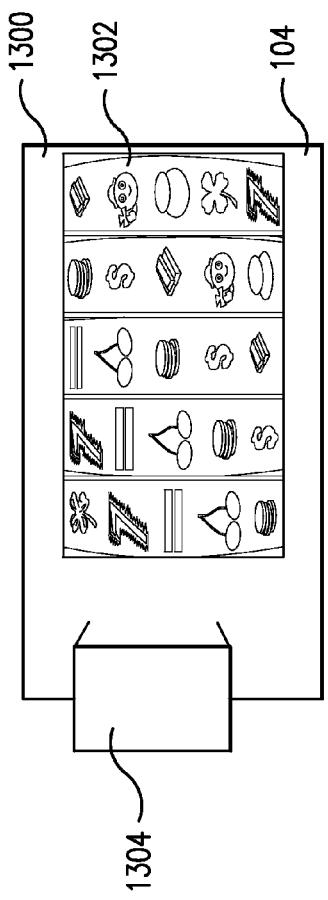
FIG. 13A
FIG. 13B

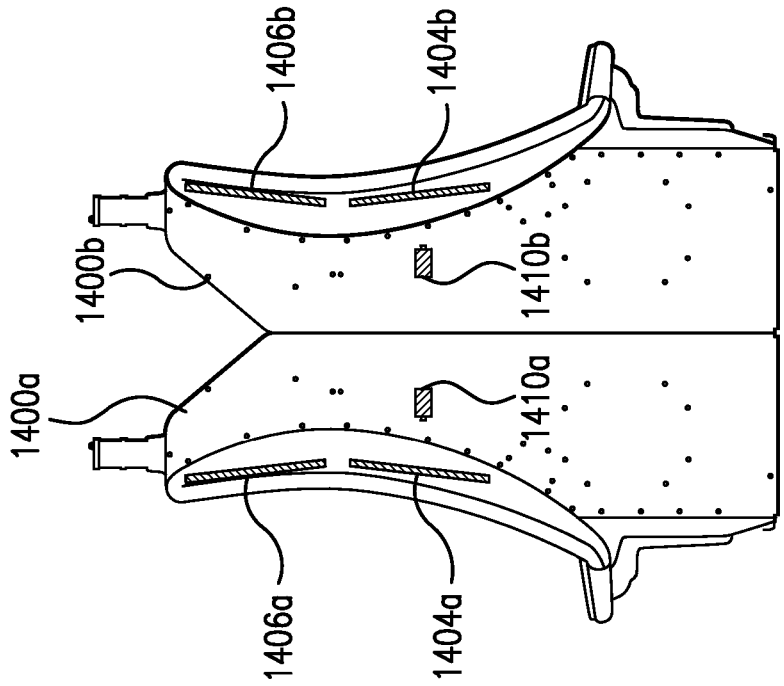
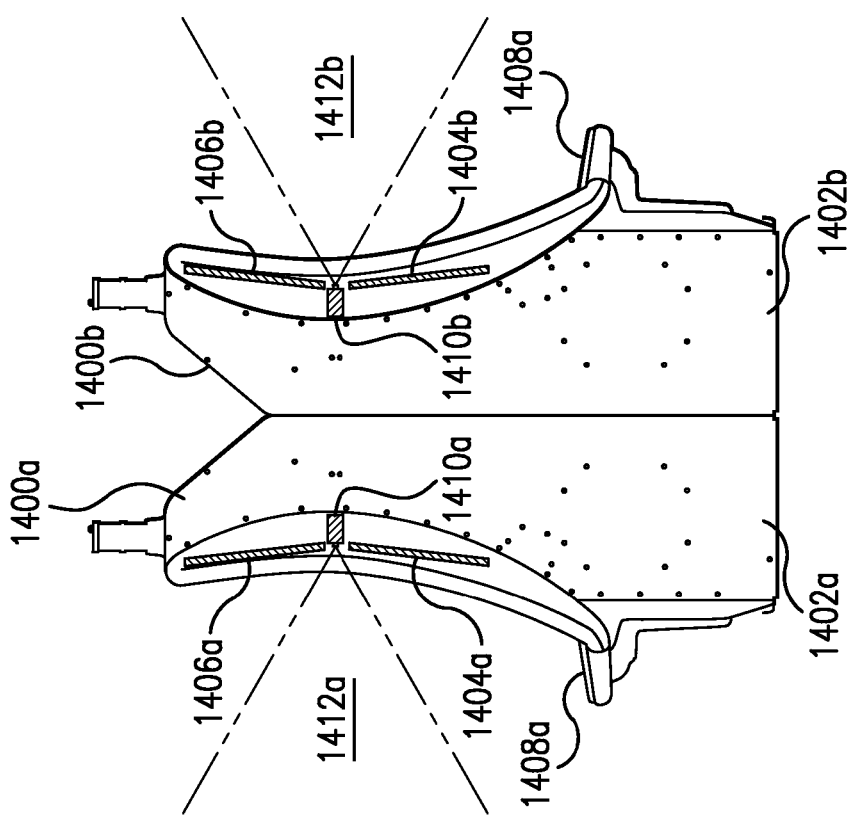

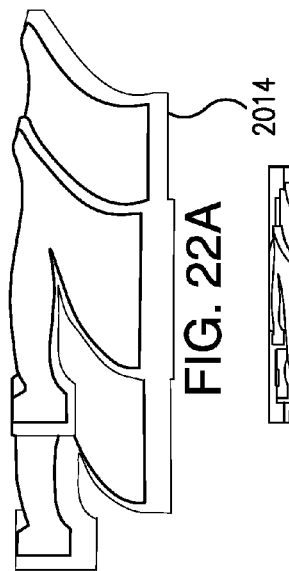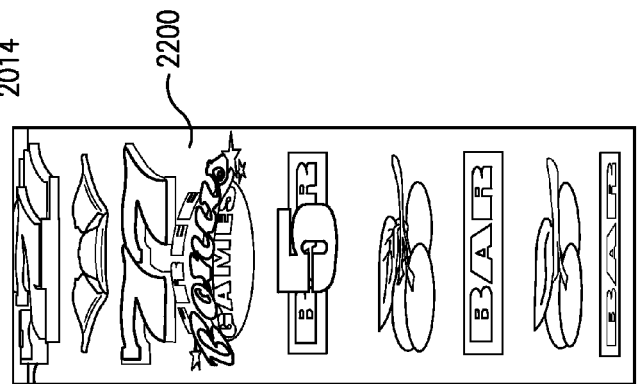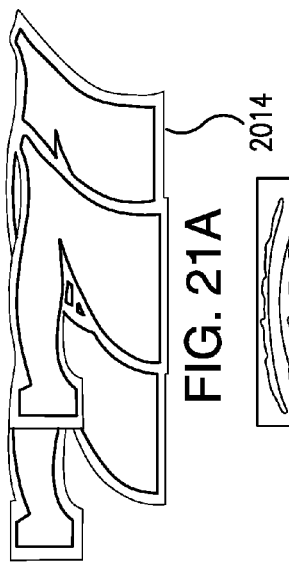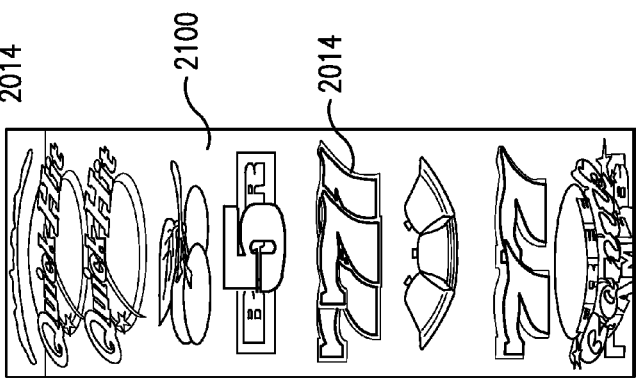

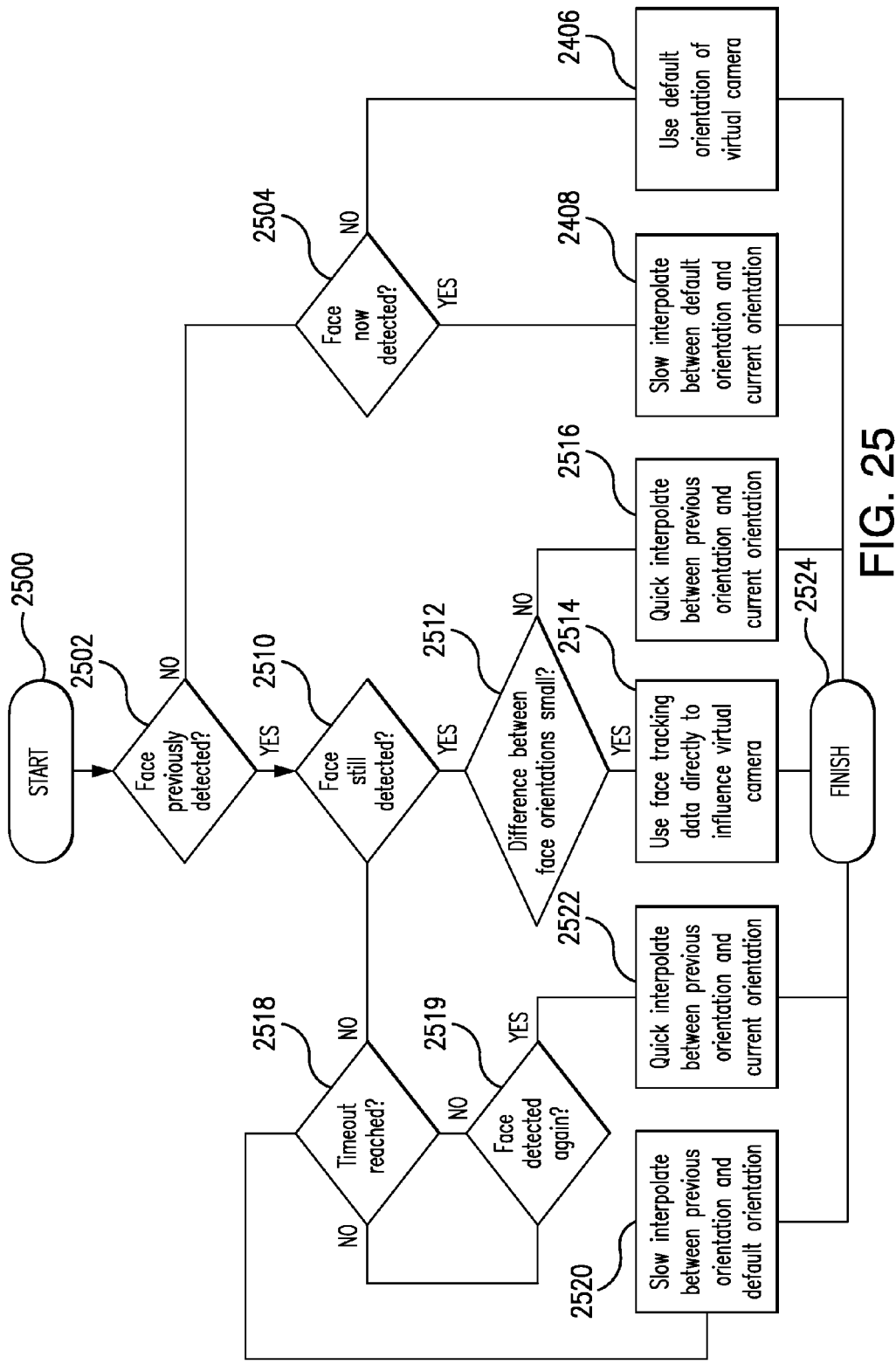

US 9,728,032 B2

GENERATING AUTO-STEREO GAMING IMAGES WITH DEGREES OF PARALLAX EFFECT ACCORDING TO PLAYER POSITION

CROSS-REFERENCE TO RELATED APPLICATIONS

This application is continuation of U.S. patent application Ser. No. 13/311,000 entitled "A Gaming System, Method and Device for Generating Images Having a Parallax Effect Using Face Tracking" filed Dec. 5, 2011 that claims priority to U.S. provisional patent application No. 61/540,659 filed Sep. 29, 2011, and titled "A Gaming System, Method and Device for Generating Images Having a Parallax Effect Using Face Tracking" and prior filed U.S. provisional patent application No. 61/422,753 filed Dec. 14, 2010, and titled "A Gaming System, Method and Device for Generating Images Having a Parallax Effect Using Face Tracking".

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The field of the invention relates to systems, methods and apparatus for the rendition of graphics at a display for a gaming device which produces a three-dimensional effect through the use of viewer-position tracking. The present invention additionally relates to using viewer position tracking to provide gesture input control of the gaming device and to determine or approximate motion parallax to provide a 3 dimensional (3D), virtual reality effect. The present invention also relates to incorporation of touch screen functionality for such gaming devices. More particularly it relates to such systems, methods and apparatus where such effects are incorporated into game play.

BACKGROUND OF THE INVENTION

Gaming devices such as casino gaming devices, e.g. slot machines, have been popular for over a century. Initially such devices were mechanical devices presenting one or more mechanical spinning reels to randomly select and display winning or losing outcomes at a single pay line. Modernly such devices are computer controlled and some include video displays, electro-mechanical stepper controlled physical reels or combinations thereof. Typically these devices display game features of a base game and perhaps one or more bonus or secondary games. For example, for a video device, the game may present a base game depicting video images of five reels each with three display positions, i.e. coordinates producing a 3×5 matrix of positions for symbols. One or more pay lines are provided. Under control of the computer processor the video display depicts the reels spinning and stopping to arrange the game symbols in the matrix and where a predetermined winning combination of symbols is obtained on a wagered upon (i.e. enabled) pay line or pay arrangement the player receives a prize. Of course the foregoing description should not be deemed to be limiting since awards may be issued for symbols scatted in the matrix, i.e. a "scatter pay" and some symbols may trigger additional features such as a secondary game.

In the prior art casino device games the secondary game may include free spins of the base game, alteration of the base game for a number of spins, e.g. making one or more symbols wild or altering the symbol sets for the reels, a game where a player makes selections to reveal one or more prizes or otherwise interacts with a game feature to produce, or try to produce, an additional award.

A drawback of these prior art gaming devices is that the game graphical images at the game video game display are two dimensional. Recently software-based graphics engines have been produced which can produce a 3D effect at an auto-stereo electronic display such as an LCD, plasma, OLED or other electronic display. One type of auto-stereo display uses lenticular or shuttering technology in combination with generation of different views for each of the left and right eye as described, for example, in Rhodes, U.S. Pat. No. 7,697,751 filed Dec. 29, 2005 and titled "Use of Ray Tracking For Generating Images For Auto-Stereo Displays", the disclosure of which is incorporated by reference. Auto-stereo displays are believed to be currently commercially available from Vortex Immersion Media, Inc., of Las Vegas, Nev.

At http://johnnylee.net/projects/wii/there is shown and proposed a conversion of a Nintendo Wii® device to provide a virtual reality effect by reversing the infrared sensor bar to the player's head (for head tracking) and the control wand to the display. Movement of the sensor bar detects movement of the player's head relative to the display and display software renders the images accordingly to produce a 3D, virtual reality, effect. Seeing Machines Inc. of Acton, Mass. at http://www.seeinomachines.com has also proposed using their head tracking software (face API) in lieu of the infrared sensors of the Wii® arrangement to provide the same effect. This technology demonstrates that using head tracking to detect head motion and rending graphics according to the determined motion parallax such that 3D, virtual reality displays can be created without using the auto-stereo techniques of "lensing" or shuttering.

It would be advantageous to incorporate the features of such technology into a gaming device. It would further be advantageous to selectively activate such features to enhance the play of the game. It would be advantageous to activate such features in connection with a bonus or feature game to increase the entertainment value of the game. It would be advantageous to activate such features relative to portions of a game or bonus display such as one or more game symbols, pay line markers, bonus game images or the like. The activation may be coordinated to the desired effect such as related to winning symbol combinations, jackpot symbols, scatter symbols or other symbols which the game designer wishes to highlight. The effect may be pronounced for some symbols and lessened for others as desired. For example, a symbol may be subject to the effect such that it appears to "extrude" or extend from a virtual reel strip.

It would be advantageous to apply a default condition to the gaming device when no player is present, i.e. the controlling electronics assumes a default head position to avoid "searching" for a non-existent player. When a player sits at the gaming machine and their head position is detected there is a lag in producing the desired effects from the default condition to the real-time position of the player's head which may introduce an unpleasant or distracting jarring or jerking effect to the 3D feature. If a player turns their head, bends over or otherwise temporarily moves their head from the target acquisition zone, similarly there is a lag until the system catches up to the movement again likely introducing a jerking effect. It would be advantageous in this regard to provide, under certain conditions, a "smoothing" of the effect to reduce the effects which may be introduced by the first acquisition of a player's face from a default condition and where the player moves their head.

It has been known to provide gaming machines with touch screen or touch sensitive displays. As is known these displays can be of various types; resistive, surface acoustic, capacitive, surface capacitance, projected capacitance or any other type. Using such a display a player can interface with the gaming device (and system) by touching appropriate areas of the display. During the play of a game the player may have to make selections such as picking cards, making wager selections or selecting between displayed icons.

It would be advantageous to provide a game where one or more features are displayed with the aforementioned 3D virtual reality effect coordinated with reconfiguration of the touch screen display to permit the player to enter prompts such as selects based upon the images rendered to the player. That is, as the images are altered by motion parallax, additional touch screen prompts can be revealed and proved to the player.

It would be advantageous to provide a game where, by movement of the player's head the player can "zoom" in on the image. For example, if a player had poor eyesight it would be advantageous for the player to simply lean toward the display to zoom in on the selected scene.

There is also a need to provide a system, apparatus and method which enables a player to enter prompts and make selections based upon sensed gestures such as movement of the head, hands or arms and which can combine this functionality with providing the aforementioned 3D effects.

There is also a need to provide a community gaming experience which incorporates the virtual reality technology.

SUMMARY OF THE INVENTION

In accordance with one embodiment of the present invention there is provided a gaming device presenting a game to be played by a player. The gaming device includes a video display and apparatus for generating data corresponding to at least the approximate position of at least a portion of the player's body relative to the display, the relative position changeable during operation of the gaming device by relative movement (actual or virtual) between the player and the display, i.e. either the player moving, movement of the display or use of a controller to effect virtual motion parallax. In this embodiment the apparatus may be a digital camera operating in the visible or infrared spectra or any other device operating in the electromagnetic spectrum or may be an acoustical position sensing device. A processor, such as a processor at the gaming device or located remotely but operatively coupled to the gaming device through a suitable communication network, is configured to receive the data from the apparatus, to render an image at the display in connection with the game based upon motion parallax, actual or virtual, between the player and the display and to detect and process at least predetermined changes to said relative position to control one or more features and/or images of the gaming device based upon the motion parallax. For example, if the apparatus senses that the player has moved their head to the right the processor renders the image so as to provide the player with a view simulating a 3D effect. The sensor can also sense this movement as a control input to control a feature of the game such as steering or moving a displayed object. As a non-limiting example, during the game the player may have to navigate through a field of images by moving the head from right to left. As they do so the processor renders the images to provide a 3D effect based upon motion parallax and the player's movement or gesture to display the navigation through the field. The relative motion may be provided by the player moving their head, nodding their head, moving their head closer to or away from the display or a combination of those movements that is sensed by the apparatus to provide input to the processor to control or operate a feature of the game. Alternatively the player may be provided with a control to move the display, e.g. physically rotate it from one side to the other or tilt it forward and back or which provides an input which does not physically move the display but controls the display to display resultant images as though the display were moved without physically moving the display, i.e. virtual or "induced" motion parallax.

In another embodiment the processor is configured to render the view of an image of the game in conventional 2D form (including high definition if desired) and based upon a predetermined event or a command render an image or a portion of the image having the aforementioned 3D effect based upon motion parallax. As but a non-limiting example, if the player obtains a certain outcome during the play of a base game such as a spinning reel slot machine-style game, one or more symbols may be displayed having the aforementioned 3D effect based upon motion parallax. Using gestures such as head movements or other relative movement the player may change the presentation of the image based upon the motion parallax to reveal hidden or obscured images such as images appearing to be behind, beneath, above, or to one side or the other of a game symbol. Revealing such images based upon motion parallax provides a 3D visualization of such images. The player may interact with the images through gesture or by the processor configuring a touch screen input device based upon the sensed movement of the player's head to enable the player to provide a touch screen input for the images.

In a related embodiment the processor may be configured to provide several degrees of the aforementioned 3D effect for example one being an attenuated version providing a minimal 3D motion parallax effect for example during normal play of the game and one which is more pronounced during, for example, during a bonus or award feature. Several degrees of the effect may be applied to one or more images or image segments to confer the desired effect.

In a further embodiment a gaming device to provide a game to a player includes a video display having a first video display overlaying at least a portion of a second display. The first display is configured to have at least a portion thereof changeable between a transparent condition and a lenticular condition where at least a portion thereof displays spaced vertical lenticular lines. An apparatus is provided for generating data corresponding to at least the approximate position correlated to the position of the player's head relative to the display, the changes to said relative position changeable during operation of the gaming device. A processor is configured to control the first display between the transparent and lenticular conditions and the second display to display images related to the play of the game in a first, two-dimensional, state and in response to a command or event and using said data from said apparatus, control the first display to display said vertical lenticular lines and one or more images at said second display to display a lenticular image based upon said data to produce a three-dimensional effect to the player for the image. As but a non-limiting example, the first and second display may be video displays. During a base game the first display is controlled to a transparent condition and the second display displays game symbols such as symbols for a reel based slot machine presentation. Upon a controlling event or condition, an image on the second display such as a slot machine symbol, is displayed in coordination with the control of the first display to the lenticular condition. The image and vertical lines of the first display are further controlled based upon the sensed relative position of the player's eyes to produce a lenticular effect for the image. If the player moves their head and eyes from one side to the other, up or down or nearer or further relative to the display the processor controls the image and lenticular line configuration to produce the aforesaid lenticular effect. The player may interact with the images through gesture or by the processor configuring a touch screen input device based upon the sensed movement of the player's head to enable the player to provide a touch screen input for the images. The relative motion may be provided by the player moving their head, nodding their head, tilting their head, moving their head closer to or away from the display or a combination of those movements that is sensed by the apparatus to provide input to the processor to control or operate a feature of the game. Alternatively the player may be provided with a control to move the display, e.g. physically rotate it from one side to the other or tilt it forward and back.

The apparatus may be a digital camera operating in the visible or infrared spectra or any other device operating in the electromagnetic spectrum or may be an acoustical position sensing device.

In a further non-limiting embodiment the gaming device may be linked to a system. At the request the gaming device, player or system related or provided images at the gaming device display(s) such as a service window are displayed to the player. The system service window may be adapted to occupy the entire real estate of the display(s) or a portion thereof such as, for example, occupying the left-side one-third of the display(s). These system related displays provide for player interaction with the system such as for playing a system provided game, uploading and downloading funds, inquiries concerning their account status and any loyalty points they may have earned, redeeming system related awards and the like. In this embodiment the gaming device or system may display one or more of the system messaging related images such as the service window with the aforementioned software or lenticular driven 3D effect. The processor would likewise recognize gesture inputs an alternatively or additionally configure an input device such as a touch screen to enable the player to input information and respond to prompts from the system.

In yet another embodiment a gaming device includes a video display and apparatus disposed at the gaming device to acquire data representing the position of the first player's eyes. The apparatus may be a digital camera or other device as referenced above. A source such as a memory or real time data from a remote digital camera provides data representing a scene. The scene may be, for example, a scene of the surroundings for the gaming device, a scene related to advertising, a scene related to a facility of a casino resort or the like. A processor is configured to display the images for the game or service window superimposed over images of the scene, to detect movement of the player's eyes and render at least one of said images of the game and/or of the scene at said display based upon motion parallax. That is, where movement of the player's eyes is detected the images are manipulated by the processor to provide the 3D effect referred to above. In a related embodiment a plurality of displays may be provided to provide the effect created by lenticular shuttering as described above.

In yet another embodiment of the present invention at least a pair of gaming devices arranged for play by first and second players. The gaming machines may be arranged in a bank such as by being side-by-side or back-to-back. A first gaming device includes a video display for displaying game content for a base game to the first player. The base game may include a video representation of slot machine reels or cards of a card game. A digital camera is arranged at the first gaming device to acquire data representing the image of the first player and background and data corresponding to the position of the first player's eyes relative to the display. For example a digital camera may be disposed on the first gaming device above, below or to one side of the video display. The first gaming device also includes a data input apparatus which may be, for example, buttons, a touch screen input device at the video display or as referenced above apparatus for detecting gestures of the first player, i.e. movement of the hands or head.

A second gaming device also includes a video display for displaying gaming game content for a base game to the second player (if any) and a digital camera to acquire data representing the image of the second player and background and data corresponding to the position of the second player's eyes relative to the display. Also provided is data input apparatus.

At least one processor is configured to, in response to triggering of an event such as a group or community gaming event, control the display for the first gaming device to display to the first player a game with images acquired by the camera of the second gaming device. In one embodiment the game may be images relating to a matrix of selections or a spinning reel game superimposed with the images of the second gaming device camera. Where the first and second gaming devices are arranged back-to-back the superimposition gives the impression to the first player that he/she is looking through their gaming device to the scene beyond the second gaming device. At least the first player inputs data to play the game to produce an outcome. The processor also controls the display of the second gaming device to display to the second player the game with images acquired by the camera of said first gaming device to a similar effect. In one embodiment the images for the game are displayed to the second player as a mirror image of the display to the first player. Where the first and second gaming devices are arranged back-to-back and during the game event the impression given to the first and second players is that they are looking through their gaming devices and the display of the game is suspended between them.

In a further embodiment the aforementioned 3D effects are, when no player is detected in the image target area, displayed based upon a default position. This default position may be based upon a hypothetical position of a player of average height and position relative to the display. For example, where the display is a gaming machine display, the default condition may display an attract image routine including the 3D effects but based upon the default position of a player. When a player is detected, according to this embodiment of the invention, a smoothing routine may be executed which smoothly transitions between the 3D effects based upon the default condition to the condition where a player is actually detected to prevent the effect from appearing to jerk or jump to the condition configured to the actual player.

BRIEF DESCRIPTION OF THE DRAWINGS

These and other features and advantages of the present invention will become apparent with reference to description and drawings wherein:

FIG. 2 is a top view of a gaming machine illustrating the movement of a player's head relative to the gaming machine display;

FIGS. 3A-3C illustrate the 3D rendering of an image based upon the movement of the player's head and eyes relative to the display;

FIGS. 4A-4B illustrate the 3D rendition of a slot machine reel set based upon movement of the eyes relative to the display;

FIGS. 10A-10C illustrate the views of an image based upon motion parallax;

FIG. 13A-13B illustrate rendition of a service window at a display;

FIGS. 14A-14B are side views for a pair of gaming devices arranged in a back-to back relationship according to another embodiment of the present invention;

FIGS. 21A and B illustrate a symbol where no extrusion effect has been applied and a reel strip include the symbol;

FIGS. 22A and B illustrate the same symbol of FIGS. 21A, B where an extrusion effect has been applied and a reel strip including the symbol.

FIG. 25 is a logic diagram for smoothing the between states of application of the effect to smooth transitions.

DETAILED DESCRIPTION OF THE PREFERRED EMBODIMENTS

Figure 1:
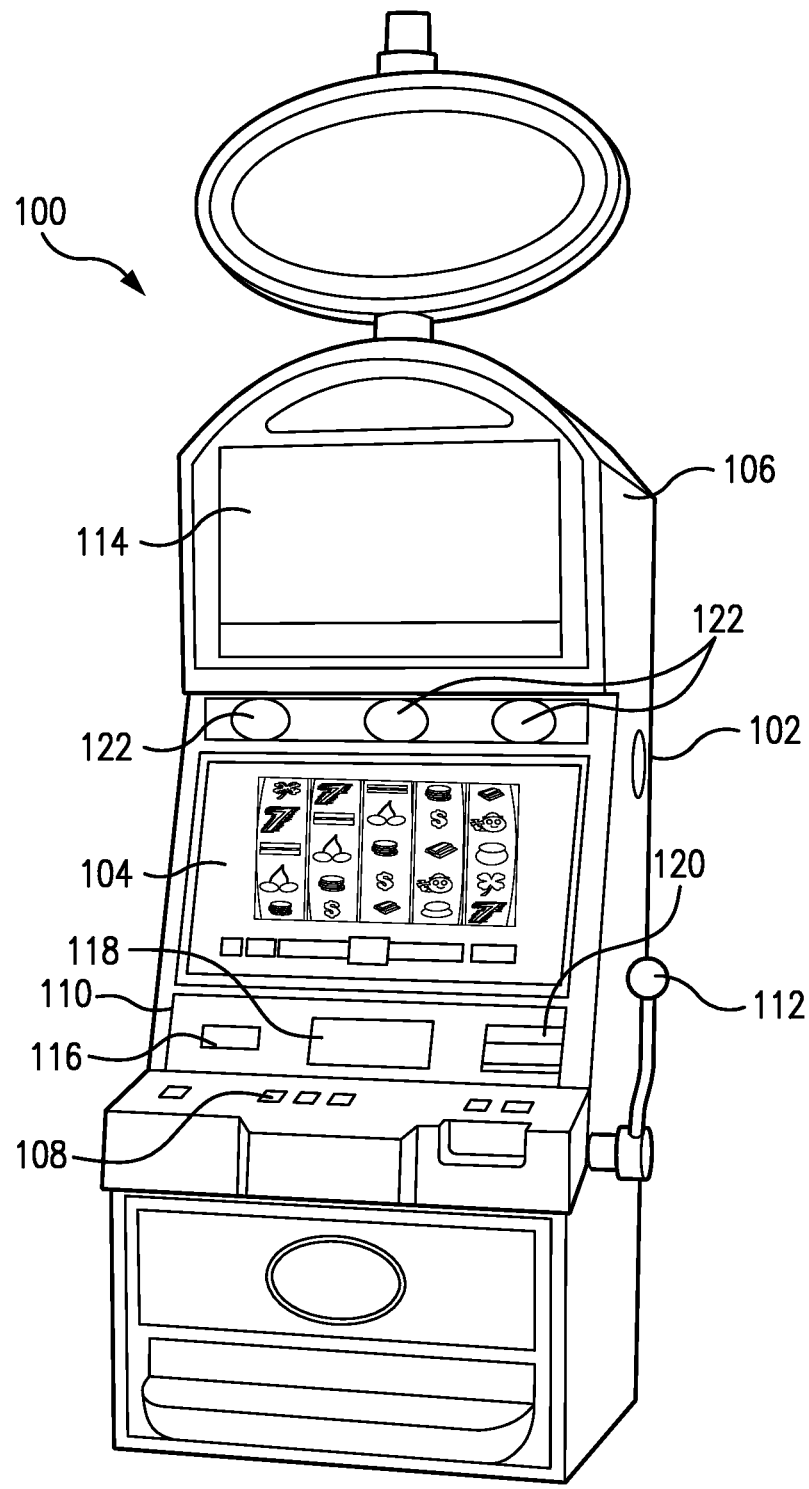
FIG. 1 is a front perspective view of a gaming device according to the present invention.

Referring now to the drawings, wherein like reference numbers denote like or corresponding elements throughout the drawings, and more particularly referring to FIG. 1, there is shown an embodiment of a gaming device 100 which may be employed according to apparatus, system and methods of the present invention. The gaming device 100 includes a cabinet housing 102, primary game display 104 upon which a primary game (sometimes referred to as a base game) and feature, bonus or community games may be displayed, top box 106 which may display multiple progressives that may be won during play of the primary, bonus or feature game, one or more player-activated input devices such as buttons 108 or by providing touch screen functionality to the primary screen display 104. A player tracking module 110 and a bill/voucher acceptor 120 may also be provided. One or more speakers (not shown) may also be mounted on the cabinet housing 102 to provide sounds to the player for example, scripted with the play of the game. The cabinet housing 102 is a self-standing unit that is generally rectangular in shape and may be manufactured with reinforced steel or other rigid materials which are resistant to tampering and vandalism. Cabinet housing 102 houses one or more processors, circuitry, data structures in the form of memory devices such as EEPROMS, flash memory, hard drive memory and software (not shown) configured for the operation of the gaming device 100 as hereinafter described. Any shaped cabinet housing may be implemented with any embodiment of gaming device 100 so long as it provides access to a player for playing a game. For example, cabinet housing 102 may comprise a slant-top, bar-top, or table-top style cabinet as is known in the art.

The plurality of player-activated buttons 108 may be used for various functions such as, but not limited to, selecting a wager denomination, selecting a game to be played, selecting a wager amount per game, initiating a game, selecting the number of pay lines to enable (i.e. wager upon) or cashing out money from gaming device 100. Buttons 108 functions as input mechanisms and may include mechanical buttons, electromechanical buttons or touch screen buttons. Optionally, a handle 112 may be pulled by a player to initiate a game.

In other embodiments, buttons 108 may be replaced with various other input mechanisms known in the art such as, but not limited to, a touch screen system, touch pad, track ball, mouse, switches, toggle switches, control/joy stick or other input means used to accept player input. For example, one input means is a universal button module as disclosed in U.S. application Ser. No. 11/106,212, entitled "Universal Button Module," filed on Apr. 14, 2005, which is hereby incorporated in its entirety by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand. In other embodiments, a virtual button deck may be used to provide similar capabilities. An example of a virtual button deck is disclosed in U.S. application Ser. No. 11/938,203, entitled, "Game Related Systems, Methods, and Articles That Combine Virtual and Physical Elements," filed on Nov. 9, 2007, hereby incorporated in its entirety by reference. As hereinafter described the buttons 108 may be replaced or augmented by data input apparatus and methods which detect gestures of a player such as nodding or shaking of the head or movement of the arms, hands or body.

The cabinet housing 102 may optionally include the top box 106 which contains "top glass" 114 comprising advertising or payout information related to the game or games available on gaming device 100. The glass 114 may be replaced by a video display configured to display the aforesaid advertising and payout information or to display one or more features of a game, progressive prize information of the like.

The player tracking module 110, as is known in the art, includes a player tracking card reader 116 and a player tracking display ("display") 118. A voucher printer may be integrated into player tracking module 110 or installed elsewhere in cabinet housing 102 or top box 106. The player tracking module 110 also includes a system interface input device such as a keypad or as by including touch screen input functionality at the display 118. Functionally the player tracking module 110 provides a communication interface between the gaming device 100 and one or more systems such as the player tracking system and/or a slot accounting system. As is known in the art the player tracking module 110 may also provide or communicate data such as gaming device meter information (i.e. coin-in, coin-out), jackpots, or other selected and configured events including maintenance, progressive, community gaming or other events. It should be understood that some communications between the gaming device 100 and any connected system may or may not pass through or communicate with the player tracking module 110. Some functionality of the player tracking module 110 may include displays at all or a portion of the primary game display 104 and/or top glass 114 display.

The primary game display 104 presents a game of chance wherein, in response to a wager, a player receives one or more outcomes from a set of potential outcomes. Mechanical or video/mechanical embodiments may include game displays such as a window or glass for viewing a number of electro-mechanical stepper reels as is known in the art or employment of a wheel for displaying/selecting either a primary game outcome or a bonus game outcome. In a video embodiment, the primary game display 104 is, typically, a CRT or a flat-panel display in the form of, but not limited to, liquid crystal, plasma, electroluminescent, vacuum fluorescent, field emission, laser or any other type of panel display known or developed in the art. The primary game display 104 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, primary game display 104 as referenced above may include a touch screen or touch glass system (not shown). The touch screen functionality may be in lieu of or in addition to input buttons 108. An example of a touch glass system is disclosed in U.S. Pat. No. 6,942,571, entitled "Gaming Device with Direction and Speed Control of Mechanical Reels Using Touch Screen," which is hereby incorporated by reference.

The primary game display 104 may is configured to present to a player wagering games such as a video or electro-mechanical reel slot game, a video keno game, a lottery game, a bingo game, a Class II bingo game, a roulette game, a craps game, a blackjack game, a mechanical or video representation of a wheel game, video Poker or other game. Additionally, the primary game display 104 alone or perhaps in conjunction with a top glass 114 video device may be configured to present one or more feature or additional games.

The primary game display 104 may also present information such as, but not limited to, player information, advertisements and casino promotions, graphic displays, news and sports updates, or even offer an alternate game. This information may be generated at the gaming device 100 or through a host computer networked with gaming device 100 on its own initiative or it may be obtained by request of the player using either one or more of the plurality of player-activated buttons 108; the primary game display 104 itself (if game display 104 comprises a touch screen or similar technology) buttons (not shown) mounted about primary game display 104 which may permit selections such as those found on an ATM machine (where legends on the screen are associated with respective selecting buttons) or any player input device that offers the required functionality.

The gaming device 100 also includes one or more apparatus for generating or acquiring data corresponding to at least the approximate position of the player's body relative to the primary game display 104. In a preferred embodiment this apparatus is one or digital cameras 122 disposed to acquire images of the player seated (or standing) during play of the gaming device 100. In most cases the gaming device 100 will be played by a seated player and therefore their body and more particularly their upper torso (arms, hands, shoulders) and head would be within a predictable field for view by the camera 122. The camera 122 may have a wide angle lens and selected focal point to acquire the images according to the present invention. For example the camera 122 may be from Videology Imaging Solutions, Inc. of Greenville, R.I. configured for 640×480 digital video output at 30 frames/sec and set to a wide angle (similar to a 300 mm lens in a 35 mm system). The camera 122 may operate in the visual spectrum or infrared. Alternative apparatus may be employed such as apparatus operating in ultrasonic frequencies. While not preferable an alternative apparatus would be a transponder requiring that the player have a device mounted on their person. While the following description will refer to the use of one or more digital cameras 122 it should be understood that the position detection device can be the other devices referenced above which function in the electromagnetic or acoustical frequencies.

One function of the digital camera 122 is to acquire and provide data which corresponds to the position and movement of the player's torso and head for purposes of which will become evident. Based upon such data the position and movement of the eyes of the player can be determined or approximated. For this purpose face tracking software such "FaceAPI" face/head tracking software available from Seeing Machines, Inc., 39 Strawberry Hill Rd, Acton, Mass. 01720, USA may be used. This software is configured to provide 3D face tracking functionality as well as orientation and facial expression detection.

FIG. 2 illustrates a top view of the gaming device 100 of FIG. 1 showing various positions of a player's head relative to the primary game display 104. At position 200 the player's head is centered whereas at position 202 the player has moved their head to right and at 204 to the left of the substantial "centered" view position at 200. By sensing the movement of the player's head (and their eyes) views of images can be generated based upon the motion parallax of the player using software or auto-stereo parallax technology as will hereinafter be described.

FIGS. 3A-3C illustrate the changes which would occur where rendering of graphics, in this case a view of a cube, is based upon motion parallax. In FIG. 3A the player's head 300 is relatively centered relative to the video display 302. The view of the cube 304 is straight on thus the player sees the front side 306. In FIG. 3B the player's head 300 has moved to the left and somewhat upward revealing the front side 306, left side 308 and top 310 of the cube 304. In FIG. 3C the player has moved their head to the right and somewhat upward revealing the front side 306, right side 312 and top 310 of the cube 304. In regards to motion parallax, it is seen that the relative movement of the player's head relative to the display reveals additional features of the image and has been shown to produce a 3D virtual reality effect. As but an example, OpenGL or DirectX 3D rendering pipeline software may be used.

Figure 3E:
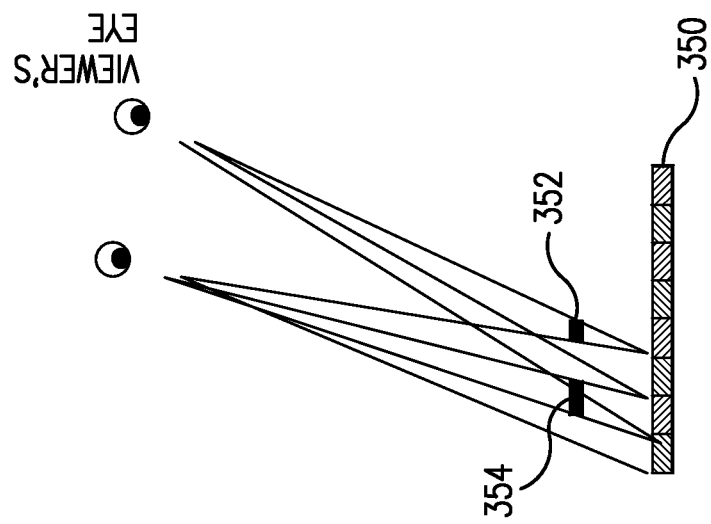
FIGS. 3D-3E illustrate the relationship between the displays and the viewers eyes using lenticular rendition of an image.
Figure 3D:
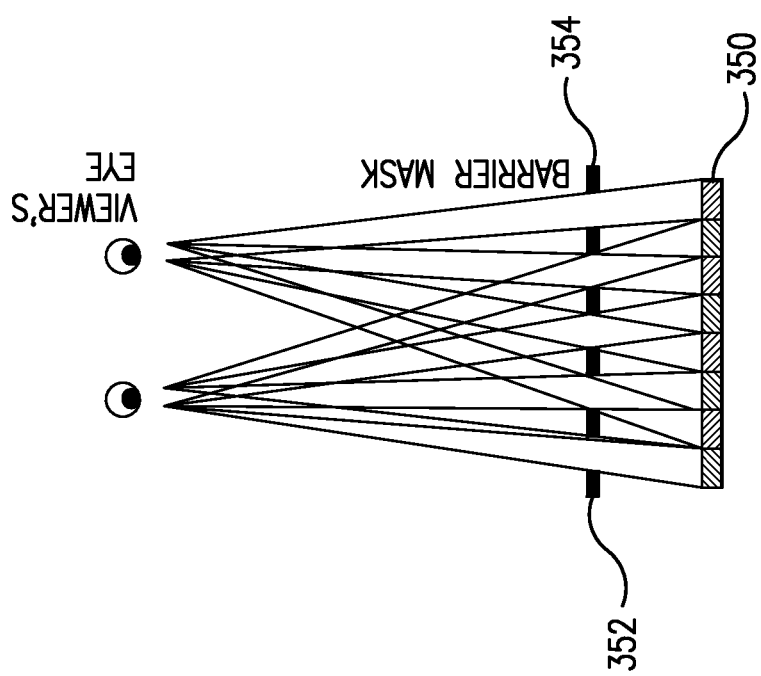

FIGS. 3D-3E illustrate a 3D, motion parallax effect which can be generated by lenticular technology as opposed to a software based approach. According to this embodiment primary game display 350 such as a video display is configured to generate graphics for the game or event. Superimposed over the primary game display 350 is a barrier mask 352 which preferably is a transparent video display which can be controlled to generate vertical, spaced, lenticular barrier lines 354. As shown in FIG. 3D the barrier lines 354 and the images displayed at the primary game display 350 are coordinated such that each eye of the viewer sees a different view of the interleaved image thereby producing the known lenticular effect. In traditional, static, lenticular presentations, the effect is attenuated if not lost when a player moves their head. To provide for the motion parallax effect using lenticular technology, the movement of the player's eyes as shown in FIG. 3E is sensed by the digital camera 122 and the primary game display 350 images and barrier mask 352 barrier lines 354 are adjusted accordingly producing the desired effect. As mentioned herein, the barrier mask 352 may include touch screen functionality and the movement of the player may be coordinated with the touch screen to provide different input opportunities to the player. Further the movement of the player can be used as a gesture input as described herein.

FIGS. 4A-4B illustrate the effect in regards to the view of a set 400 of slot machine reels displayed at the gaming device 100 primary game display 104. In FIG. 4A the gaming device 100 is provided with a digital camera 122 disposed between the primary game display 104 and the top glass 114. The player's eye position 402 in FIG. 4A is approximately aligned with the center of the primary game display 104 hence the set 400 of reels appears such that only the front of the reel strips is visible. The graphics software rending the view of the reel strips may be configured to provide a degree of perspective. If the player moves their head to the left to a position suggested in FIG. 4B this movement is detected by the digital camera 122 and the primary game display 104 is controlled to display the set 400 of reels such that it appears to the player that they are seeing somewhat behind the front of the reel strips to view the rear structure of the reels. The advantages and features of this functionality will be described below.

Figure 5A:
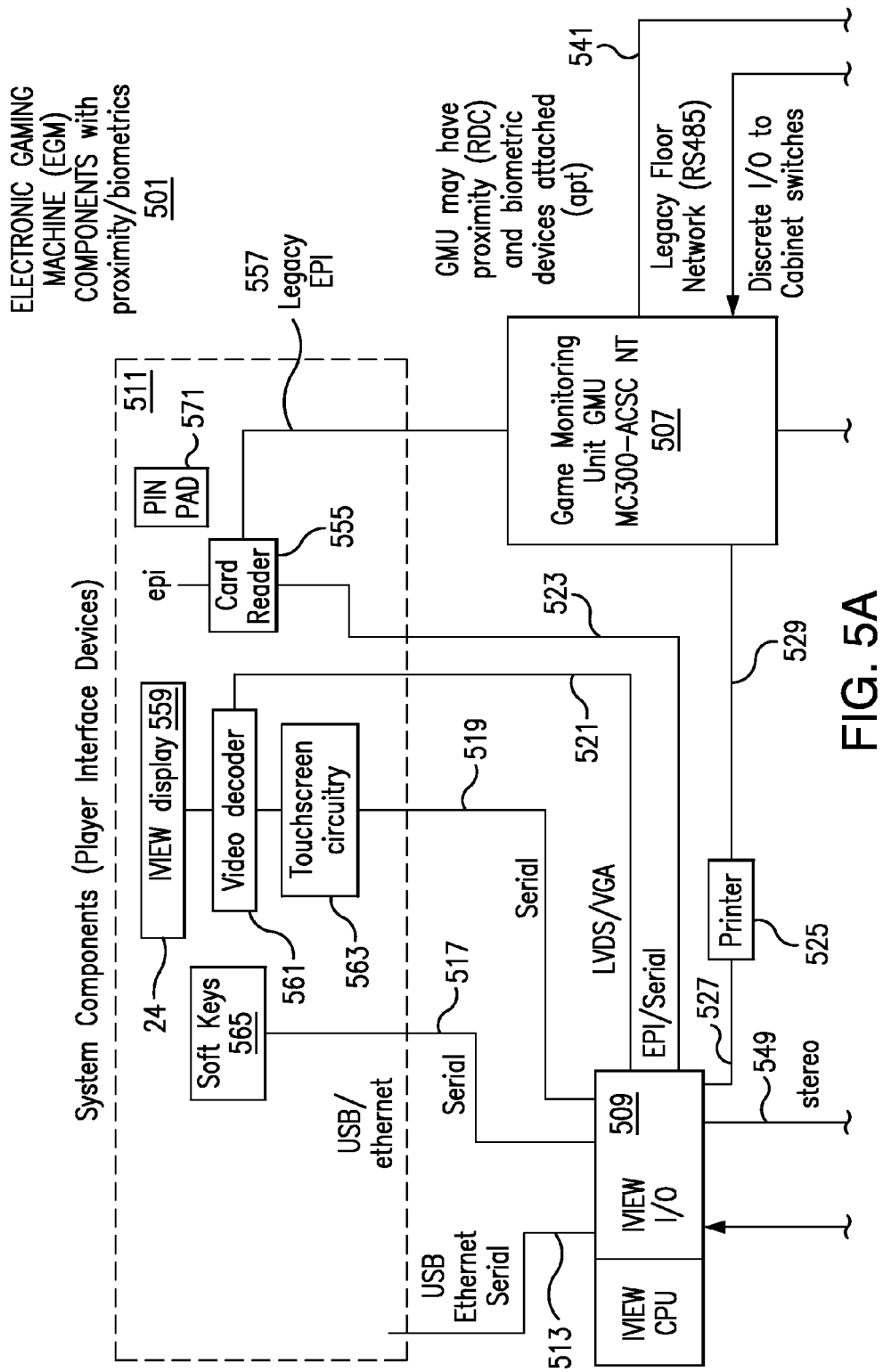
FIG. 5A-5B illustrate an example of a gaming machine operational platform and components for a gaming terminal of the type of the present invention.
Figure 5B:
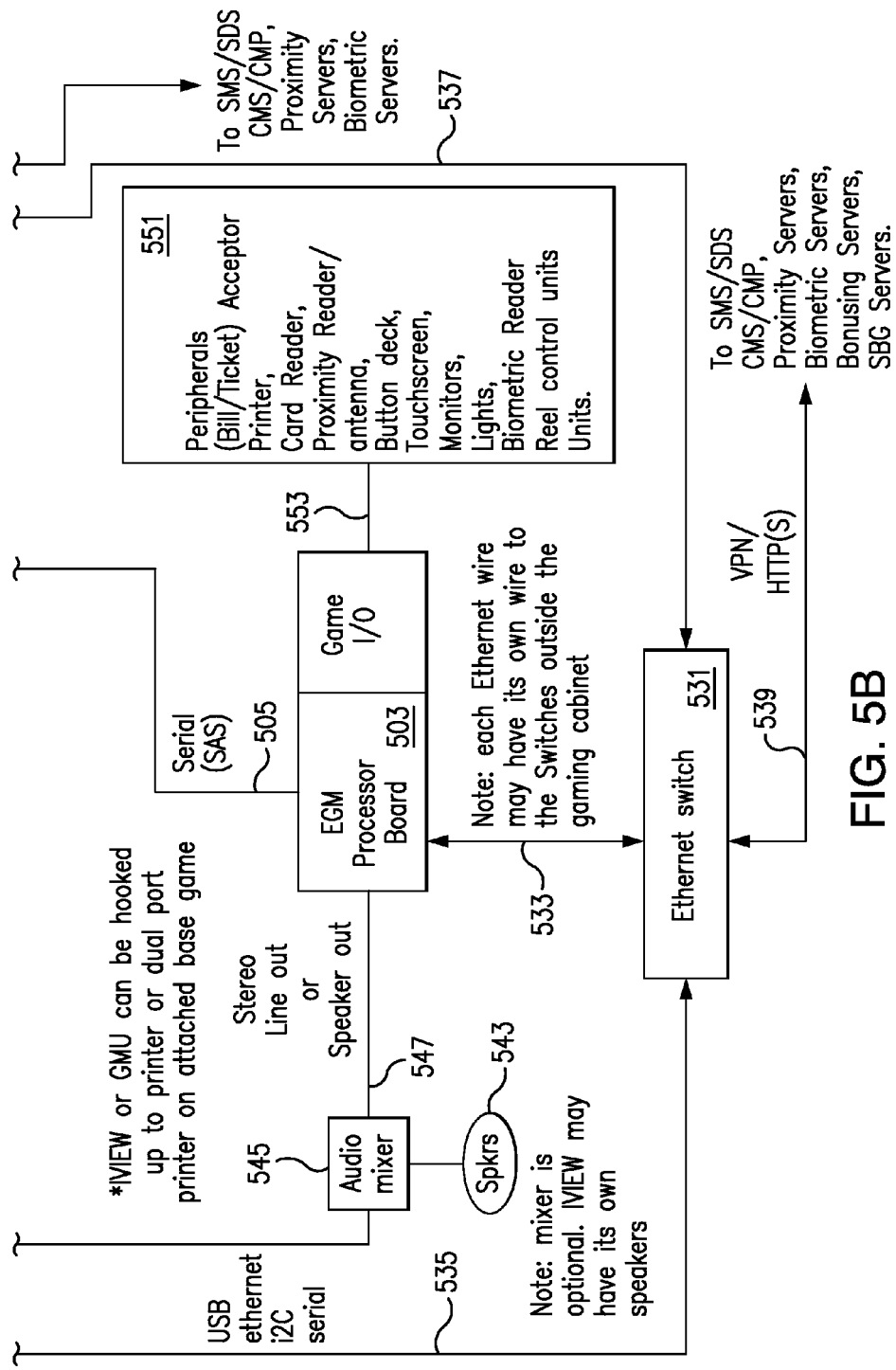

Turning to FIGS. 5A-5B the gaming device 100 hardware 501 for its various controller(s) is shown for purposes of illustration. The hardware 501 includes base game integrated circuit board 503 (EGM Processor Board) connected through serial bus 505 to game monitoring unit (GMU) 507 (such as a Bally MC300 or ACSC NT), and player interface integrated circuit board (PIB) 509 connected to player system interface devices 511 over buses 513, 517, 519, 521, 523. Gaming voucher ticket printer 525 (for printing player cash out tickets) is connected to PIB 509 and GMU 507 over buses 527, 529. EGM Processor Board 503, PIB 509, and GMU 507 connect to Ethernet switch 531 over buses 533, 535, 537. Ethernet switch 531 connects to a slot management system (SMS) and a casino management system (CMS) network over bus 539. Ethernet switch 531 may also connect to a server based gaming server or a downloadable gaming server. GMU 507 also may connect to the SMS and CMS network over bus 541. Speakers 543 produce sounds related to the game or according to the present invention connect through audio mixer 545 and buses 547, 549 to EGM Processor Board 503 and PIB 509.

Peripherals 551 connect through bus 553 to EGM Processor Board 503. The peripherals 551 include, but are not limited to the following and may include individual processing capability: bill/ticket acceptor to validate and accept currency and ticket vouchers, player loyalty card reader, the player interfaces including features to support the touch screen/gesture functionality such as buttons 108, primary game display 104, and secondary display (with or without touch screen functionality), monitors and lights, reel control units where the gaming device 100 is a stepper game and biometric reading (capturing) devices such as the digital camera(s) 122. For example, a bill/ticket acceptor is typically connected to the game input-output board of the EGM processing board 503 (which is, in turn, connected to a conventional central processing unit ("CPU") board), such as an Intel Pentium microprocessor mounted on a gaming motherboard. The I/O board may be connected to CPU processor board by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming device operating system (OS), such as a Bally Alpha OS. EGM processor board 503 executes a game program that causes the gaming device 100 to display and play a game. The various components and included devices may be installed with conventionally and/or commercially available components, devices, and circuitry into a conventional and/or commercially available gaming housing, examples of which are described above (e.g., cabinet housing 102).

When a player has inserted a form of currency such as, for example and without limitation, paper currency, coins or tokens, cashless tickets or vouchers, electronic funds transfers or the like into the currency acceptor, a signal is sent by way of bus 553 to the I/O board and to EGM processor board 503 which, in turn, assigns an appropriate number of credits for play in accordance with the game program. The player may further control the operation of the gaming device 100 by way of other peripherals 551, for example, to select the amount to wager via a player interface such as the buttons 108. The game starts in response to the player operating a start mechanism such as the handle 112, button such as a SPIN/RESET button touch screen icon or depressing a button 108 or pulling the handle 112. The game program includes a random number generator to provide a display of randomly selected indicia on one or more of the primary and/or secondary displays. In some embodiments, the random number generator may be physically separate from gaming device 100; for example, it may be part of a central determination host system which provides random game outcomes to the game program. Finally, processor board 503 under control of the game program and OS compares the final display of indicia to a pay table. The set of possible game outcomes may include a subset of outcomes related to the triggering of a feature or bonus game. In the event the displayed outcome is a member of this subset, processor board 503, under control of the game program and by way of I/O Board 553, may cause feature game play to be presented on the primary game display 104 or a display constituting all or a portion of the top glass 114.

Predetermined payout amounts for certain outcomes, including feature game outcomes, are stored as part of the game program. Such payout amounts are, in response to instructions from processor board 503, provided to the player in the form of coins, credits or currency via I/O board and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server such as a downloadable gaming server. The gaming device 100 may access the remote storage device via a network connection, including but not limited to, a local area network connection, a TCP/IP connection, a wireless connection, or any other means for operatively networking components together. Optionally, other data including graphics, sound files and other media data for use with the gaming device 100 are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the gaming device 100 using USB, serial or Ethernet connections. Each of the respective devices may have upgrades to their firmware utilizing these connections.

GMU 507 includes an integrated circuit board and GMU processor and memory including coding for network communications, such as the G2S (game-to-system) protocol from the Gaming Standards Association, Las Vegas, Nev., used for system communications over the network. As shown, GMU 507 may connect to a player card reader 555 (component 116 in FIG. 1) through bus 557 and may thereby obtain player card information and transmit the information over the network through bus 541. Gaming activity information may be transferred by the EGM Processor Board 503 to GMU 507 where the information may be translated into a network protocol, such as S2S, for transmission to a server, such as a player tracking server, where information about a player's playing activity may be stored in a designated server database.

PID 509 includes an integrated circuit board, PID processor, and memory which includes an operating system, such as Windows CE, a player interface program which may be executable by the PID processor together with various input/output (I/O) drivers for respective devices which connect to PID 509, such as player interface devices 511, and which may further include various games or game components playable on PID 509 or playable on a connected network server and PID 509 is operable as the player interface. PID 509 connects to card reader 555 through bus 523, player system interface display 24 through video decoder 561 and bus 521, such as an LVDS or VGA bus.

As part of its programming, the PID processor executes coding to drive the display 118 and provide messages and information to a player. Touch screen circuitry 563 interactively connects the display 118 and video decoder 561 to PID 509; such that a player may input information and cause the information to be transmitted to PID 509 either on the player's initiative or responsive to a query by PID 509. Additionally soft keys 565 connect through bus 517 to PID 509 and operate together with the display 118 to provide information or queries to a player and receive responses or queries from the player. PID 509, in turn, communicates over the CMS/SMS network through Ethernet switch 531 and busses 535, 539 and with respective servers, such as a player tracking server.

Player interface devices 511, i.e. devices of the player tracking module 110, are linked into the virtual private network of the system components in gaming device 100. The system components include the iVIEW® device ("iView" is a registered trademark of Bally Gaming, Inc.) processing board and game monitoring unit (GMU) processing board may provide the functionality of the player tracking module 110. These system components may connect over a network to the slot management system (such as a commercially available Bally SDS/SMS) and/or casino management system (such as a commercially available Bally CMP/CMS). The player interface devices 511 may also include the digital camera(s) 122 in lieu or in addition to providing the digital cameras on the cabinet housing 102.

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

In an alternative embodiment the player system interface including the player tracking display 118 may instead be presented, upon command or request by the player, as all or a portion of the primary game display 104 as what is referred to a system interface window or service window. Where the primary game display 104 has touch screen functionality, upon command or a request, the content at the primary game display 104 such as a video reel game display is sized to accommodate the service window display at the primary game display 104. The touch screen functionality for the primary game display 104 is configured to enable the player to interact with the interface through touch screen controls (buttons, sliders, arrows, etc.).

Figure 6:
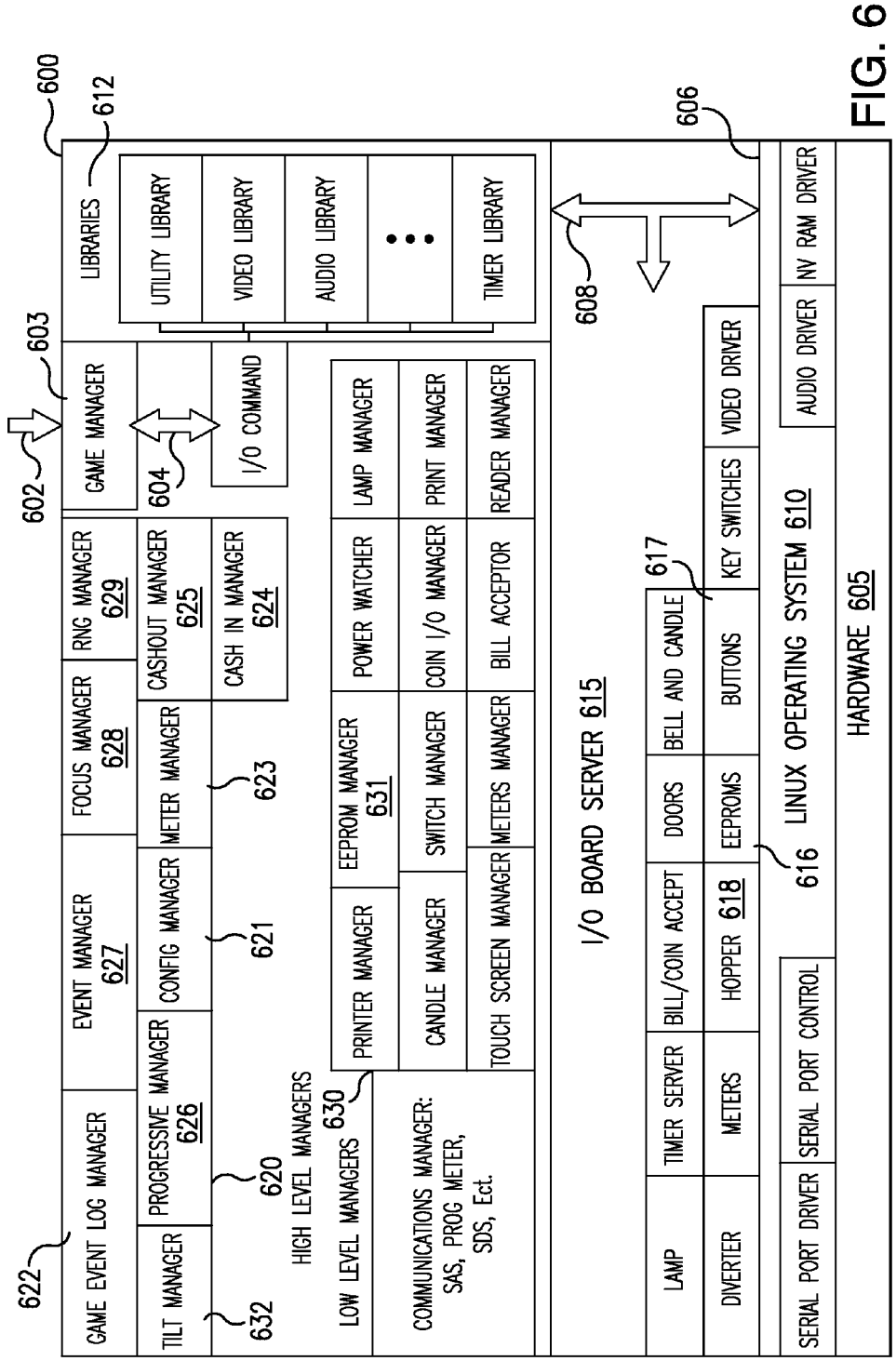
FIG. 6 is a block diagram of the logical components of a gaming kernel for a gaming terminal.

Turning to FIG. 6 is a functional block diagram of a gaming kernel 600 of a game program under control of processor board 503, uses gaming kernel 600 by calling into application programming interface (API) 602, which is part of game manager 603. According to the present invention the API 602 may include the software module(s) such as the faceAPI (referenced above) for face tracking as well as the software module(s) for rendering the 3d virtual reality images based upon detected motion parallax. These software applications may be stored in a suitable memory device such as a flash memory, thumb drive or the like. The components of game kernel 600 as shown in FIG. 3 are only illustrative, and should not be considered limiting. For example, the number of managers may be changed, additional managers may be added or some managers may be removed without deviating from the scope and spirit of the invention.

As shown in the example, there are three layers: a hardware layer 605; an operating system layer 610, such as, but not limited to, Linux; and a game kernel layer 600 having game manager 603 therein. In one or more embodiments, the use of a standard operating system 610, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 600 executes at the user level of the operating system 610, and itself contains a major component called the I/O Board Server 615. To properly set the bounds of game application software (making integrity checking easier), all game applications interact with gaming kernel 600 using a single API 602 in game manager 603. This enables game applications to make use of a well-defined, consistent interface, as well as making access points to gaming kernel 600 controlled, where overall access is controlled using separate processes.

For example, game manager 603 parses an incoming command stream and, when a command dealing with I/O comes in (arrow 604), the command is sent to an applicable library routine 612. Library routine 612 decides what it needs from a device, and sends commands to I/O Board Server 615 (see arrow 608). A few specific drivers remain in operating system 610's kernel, shown as those below line 606. These are built-in, primitive, or privileged drivers that are (i) general (ii) kept to a minimum and (iii) are easier to leave than extract. In such cases, the low-level communications is handled within operating system 610 and the contents passed to library routines 612.

Thus, in a few cases library routines may interact with drivers inside operating system 610, which is why arrow 608 is shown as having three directions (between library utilities 612 and I/O Board Server 615, or between library utilities 612 and certain drivers in operating system 610). No matter which path is taken, the logic needed to work with each device is coded into modules in the user layer of the diagram. Operating system 610 is kept as simple, stripped down, and common across as many hardware platforms as possible. The library utilities and user-level drivers change as dictated by the game cabinet or game machine in which it will run. Thus, each game cabinet or game machine may have an industry standard processor board 503 connected to a unique, relatively dumb, and as inexpensive as possible I/O adapter board, plus a gaming kernel 600 which will have the game-machine-unique library routines and I/O Board Server 615 components needed to enable game applications to interact with the gaming machine cabinet. Note that these differences are invisible to the game application software with the exception of certain functional differences (i.e., if a gaming cabinet has stereo sound, the game application will be able make use of API 602 to use the capability over that of a cabinet having traditional monaural sound).

Game manager 603 provides an interface into game kernel 600, providing consistent, predictable, and backwards compatible calling methods, syntax, and capabilities by way of game application API 602. This enables the game developer to be free of dealing directly with the hardware, including the freedom to not have to deal with low-level drivers as well as the freedom to not have to program lower level managers 630, although lower level managers 630 may be accessible through game manager 603's interface 602 if a programmer has the need. In addition to the freedom derived from not having to deal with the hardware level drivers and the freedom of having consistent, callable, object-oriented interfaces to software managers of those components (drivers), game manager 603 provides access to a set of high level managers 620 also having the advantages of consistent callable, object-oriented interfaces, and further providing the types and kinds of base functionality required in casino-type games. Game manager 603, providing all the advantages of its consistent and richly functional interface 602 as supported by the rest of game kernel 600, thus provides a game developer with a multitude of advantages.

Game manager 603 may have several objects within itself, including an initialization object (not shown). The initialization object performs the initialization of the entire game machine, including other objects, after game manager 603 has started its internal objects and servers in appropriate order. In order to carry out this function, the kernel's configuration manager 621 is among the first objects to be started; configuration manager 621 has data needed to initialize and correctly configure other objects or servers.

The high level managers 620 of game kernel 600 may include game event log manager 622 which provides, at the least, a logging or logger base class, enabling other logging objects to be derived from this base object. The logger object is a generic logger; that is, it is not aware of the contents of logged messages and events. The log manager's 622 job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 623 manages the various meters embodied in the game kernel 600. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 623 receives its initialization data for the meters, during start-up, from configuration manager 621. While running, the cash in 624 and cash out 625 managers call the meter manager's 623 update functions to update the meters. Meter manager 623 will, on occasion, create backup copies of the soft meters by storing the soft meters' readings in EEPROM. This is accomplished by calling and using EEPROM manager 631.

Progressive manager 626 manages progressive games playable from the game machine. Event manager 627 is generic, like log manager 622, and is used to manage various gaming device events. Focus manager 628 correlates which process has control of various focus items. Tilt manager 632 is an object that receives a list of errors (if any) from configuration manager 621 at initialization, and during game play from processes, managers, drivers, etc. that may generate errors. Random number generator manager 629 is provided to allow easy programming access to a random number generator (RNG), as a RNG is required in virtually all casino-style (gambling) games. RNG manager 629 includes the capability of using multiple seeds.

A credit manager object (not shown) manages the current state of credits (cash value or cash equivalent) in the game machine, including any available winnings, and further provides denomination conversion services. Cash out manager 625 has the responsibility of configuring and managing monetary output devices. During initialization, cash out manager 625, using data from configuration manager 621, sets the cash out devices correctly and selects any selectable cash out denominations. During play, a game application may post a cash out event through the event manager 627 (the same way all events are handled), and using a call back posted by cash out manager 625, cash out manager 625 is informed of the event. Cash out manager 625 updates the credit object, updates its state in non-volatile memory, and sends an appropriate control message to the device manager that corresponds to the dispensing device. As the device dispenses dispensable media, there will typically be event messages being sent back and forth between the device and cash out manager 625 until the dispensing finishes, after which cash out manager 625, having updated the credit manager and any other game state (such as some associated with meter manager 623) that needs to be updated for this set of actions, sends a cash out completion event to event manager 627 and to the game application thereby. Cash in manager 624 functions similarly to cash out manager 625, only controlling, interfacing with, and taking care of actions associated with cashing in events, cash in devices, and associated meters and crediting.

In a further example, in accordance with one or more embodiments, I/O server 615 may write data to the gaming machine EEPROM memory, which is located in the gaming machine cabinet and holds meter storage that must be kept even in the event of power failure. Game manager 603 calls the I/O library functions to write data to the EEPROM. The I/O server 615 receives the request and starts a low priority EEPROM thread 616 within I/O server 615 to write the data. This thread uses a sequence of 8 bit command and data writes to the EEPROM device to write the appropriate data in the proper location within the device. Any errors detected will be sent as IPC messages to game manager 603. All of this processing is asynchronous.

In accordance with one embodiment, button module 617 within I/O server 615, polls (or is sent) the state of buttons at the user interface 1018 every two milliseconds. These inputs are debounced by keeping a history of input samples. Certain sequences of samples are required to detect a button was pressed, in which case the I/O server 615 sends an inter-process communication event to game manager 603 that a button was pressed or released. In some embodiments, the gaming machine may have intelligent distributed I/O which debounces the buttons, in which case button module 617 may be able to communicate with the remote intelligent button processor to get the button events and simply relay them to game manager 603 via IPC messages. In still another embodiment, the I/O library may be used for pay out requests from the game application. For example, hopper module 618 (where a coin/token hopper is provided) must start the hopper motor, constantly monitor the coin sensing lines of the hopper, debounce them, and send an IPC message to the game manager 603 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 7:
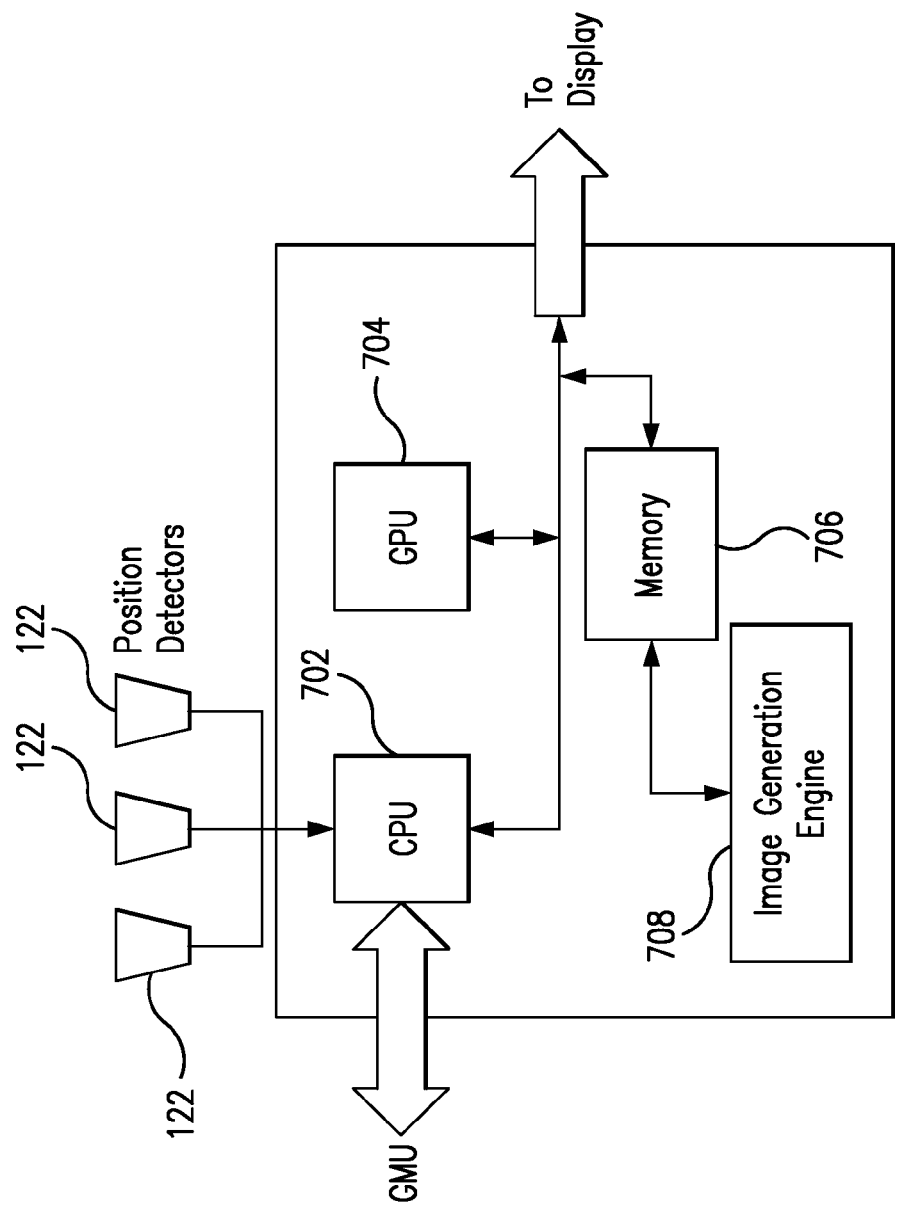
FIG. 7 is a block diagram showing components of the gaming device according to the present invention.

Turning to FIG. 7 there is shown a block diagram illustrating in a simplified fashion the functional components for the gaming device 100 according to an embodiment of the present invention. One or more digital cameras 122 are provided as described above. In one embodiment only a single digital camera 122 may be disposed on the gaming device 100 and configured to capture data representing the position of at least the player's head and eyes. Where gesture control is desired the digital camera 122 may be configured to capture the upper torso of the player as well as by using a wider angle lens. The data from the digital camera 122 is provided to a processor such as CPU 702 which may be the EGM processor board 503 or GMU 507 described above or a separate processor located at the gaming device 100, player tracking module 110 or remotely where remote processing is desired. As shown the CPU 702 is in communication with the GMU 507 as well as a graphics processing unit 704, memory device 706 and image generation module or engine 708. The engine 708 for generating the 3D virtual reality images as described herein may be, as discussed above, programmed as one of the libraries 612 of the gaming kernel 600 and stored in a suitable memory.

As described in detail below when the 3D virtual reality functionality is enabled, the peripherals such as the primary game display 104, digital camera 122 and the touch screen may be configured to provide additional functionality to the game according to the present invention.

Figure 8:
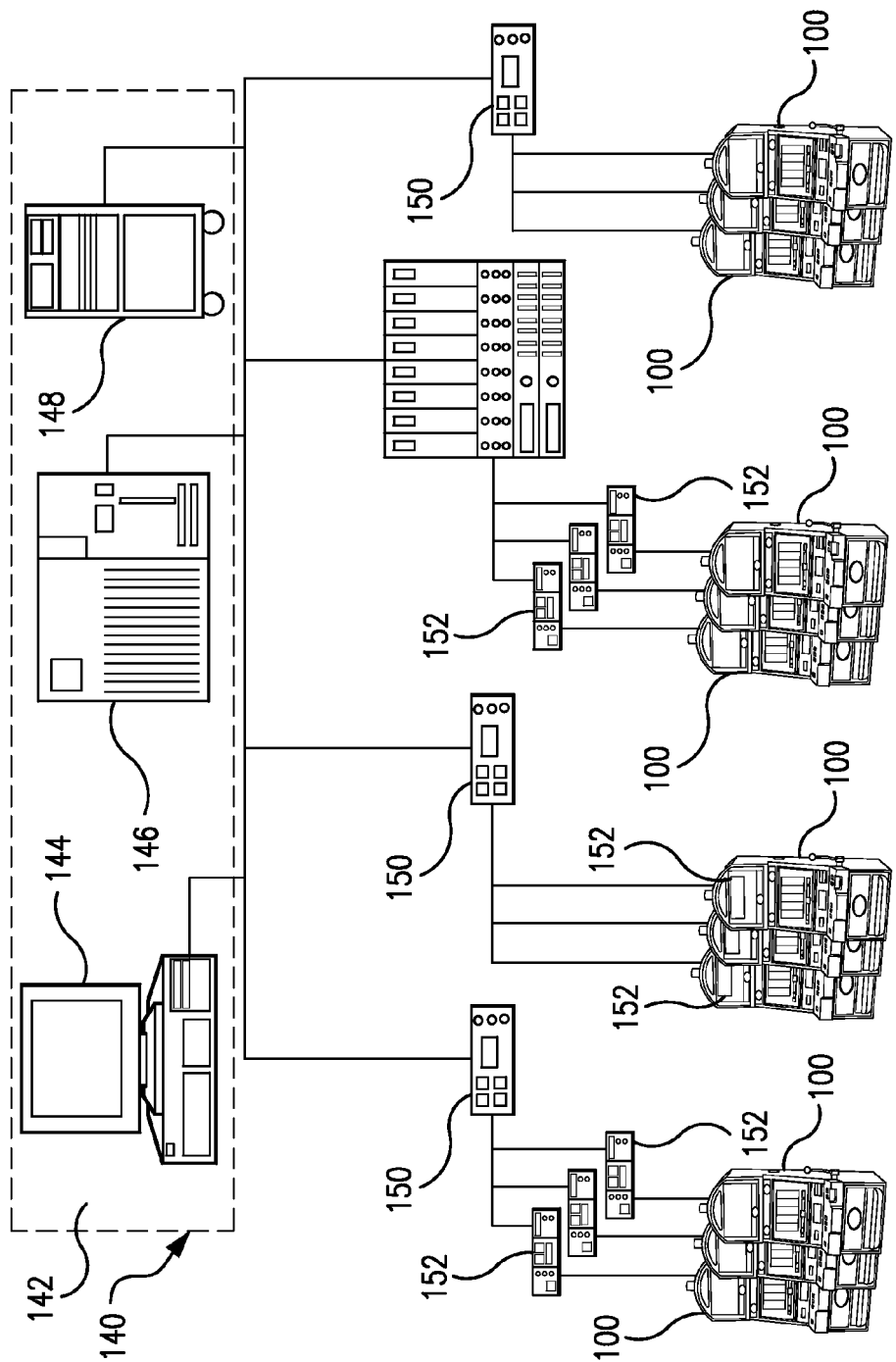
FIG. 8 is a schematic of an example of a network incorporating gaming terminals.

In many cases the gaming device 100 will be connected to one or more systems. FIG. 8 illustrates a casino gaming system 140 that may include one or more gaming devices 100 and one or more servers. Networking components facilitate communications between a backend system 142 and game management units 152 that control displays for carousels of gaming devices 100 across a network. Game management units (GMU's) 152 (507 in FIG. 5A) connect the gaming devices 100 to networking components and may be installed in the cabinet housing 102 or external to the gaming device 100. The function of the GMU 152 is similar to the function of a network interface card connected to a desktop personal computer (PC). Some GMU's 152 have much greater capability and can perform such tasks as presenting and playing a game using a display (not shown) operatively connected to the GMU 152. In one embodiment, the GMU 152 is a separate component located outside the gaming device 100. Alternatively, in another embodiment, the GMU 152 is located within the gaming device 100 as the player tracking module 110 (FIG. 1). Optionally, in an alternative embodiment, one or more gaming devices 100 connect directly to a network and are not connected to a GMU 152.

The gaming devices 100 are connected via a network to a network bridge 150, which is used for networking, routing and polling gaming devices, including slot machines. The network bridge 150 connects to the back end system 142. Optionally, the gaming devices 100 may connect to the network via a network rack 154, which provides for a few numbers of connections to the back end system 142. Both, network bridge 150 and network rack 154 may be classified as middleware, and facilitate communications between the back end system 142 and the GMUs 152. The network bridges 150 and network rack 154 may comprise data repositories for storing network performance data. Such performance data may be based on network traffic and other network related information. Optionally, the network bridge 804 and the network rack 806 may be interchangeable components. For example, in one embodiment, a casino gaming system may comprise only network bridges 150 and no network racks 154. Alternatively, in another embodiment, a casino gaming system may comprise only network racks 154 and no network bridges 150. Additionally, in an alternative embodiment, a casino gaming system may comprise any combination of one or more network bridges 150 and one or more network racks 154.

The back end system 142 may be configured to comprise one or more servers as hereinafter described. The type of server employed is generally determined by the platform and software requirements of the gaming system. In one embodiment, as illustrated in FIG. 4, the back end system 142 is configured to include three servers: a slot floor controller 144, a casino management server 146 and a casino database 148. As described with reference to FIG. 5 the casino resort enterprise may include other servers. The slot floor controller 144 is a part of the player tracking system for gathering accounting, security and player specific information. The casino management server 146 and casino database 148 work together to store and process information specific to both employees and players. Player specific information includes, but is not limited to, passwords, biometric identification, player card identification, and biographic data. Additionally, employee specification information may include biographic data, biometric information, job level and rank, passwords, authorization codes and security clearance levels.

Overall, the back end system 142 performs several functions. For example, the back end system 142 can collect data from the slot floor as communicated to it from other network components, and maintain the collected data in its database. The back end system 142 may use slot floor data to generate a report used in casino operation functions. Examples of such reports include, but are not limited to, accounting reports, security reports, and usage reports. The back end system 142 may also pass data to another server for other functions. Alternatively, the back end system 142 may pass data stored on its database to floor hardware for interaction with a game or game player. For example, data such as a game player's name or the amount of a ticket being redeemed at a game may be passed to the floor hardware. Additionally, the back end system 142 may comprise one or more data repositories for storing data. Examples of types of data stored in the system server data repositories include, but are not limited to, information relating to individual player play data, individual game accounting data, gaming terminal accounting data, cashable ticket data, sound data, and optimal display configurations for one or more displays for one or more system game. In certain embodiments the back end system 142 may include game download functionality to download and change the game played on the gaming devices 100, provide server based gaming or provide some or all of the data processing (including if desired graphics processing as described herein) to the gaming devices 100.

Of course, one will appreciate that a gaming system 140 may also comprise other types of components, and the above illustrations are meant only as examples and not as limitations to the types of components or games used in a casino gaming system.

According to a feature of the present invention the camera 122 is configured to capture the image of the player to determine or approximate the position of the player's eyes relative to the primary game display 104 for the purpose of rendering 3D graphical images. The camera 122 may be positioned at various locations on the gaming device 100; however in a preferred embodiment is offset from the center of the primary game display 104 as by being located between the display 104 and top glass 114 or to one side or the other of the primary game display 104 in the event the primary game display 104 is oriented in a portrait mode. As such the determination of the position of the player's eyes must take into account the offset from the center of the primary game display 104. This may be done by one or more of calculation or empirical alignment. For example, based upon the location the digital camera 122 measurements may determine the amount of offset. Preferably even though the compensation for offset can be mathematically calculated and accounted for empirical adjustment may be required to make sure the effect is not warped by misalignment and hence erroneous determination of the position of the player's eyes. For example, upon installation a standard target at a standard position corresponding to the position of a typical player's eyes may be used to configure the offset and focus the digital camera 122 to the desired field for the desired capture of data. It should be noted that this field may include a field to include other portions of the player's body where, for example, gesture input control is desired.

FIGS. 10A-10C illustrate and image, for example a slot machine symbol of cherries, which can be altered based upon motion parallax caused by relative movement between the player's eyes and the display. At FIG. 10A there is shown an image of an object 1000 which is the front face 1002 of a three-dimensional image such as a cube as illustrated or sphere, pyramid, cone, cylinder, parallel-piped or other three-dimensional object. When the player moves their head upward, this movement is detected by the digital camera 122 causing the software to render the object 1000 as in FIG. 10B to now show the front face 1002 as well as the top 1004 surface. In FIG. 10C of the player has moved their head to the left and upward (again detected by the digital camera 122) to reveal the front face 1002, top 1004 and left side 1006 of the object 1000. Thus when the player moves their head, this movement is detected ad the software generates graphics based upon the motion parallax of the player to control the view of the object 1000 at the display producing a 3D effect.

According to the present invention inasmuch as the position of the player's head (and torso) is being detected by the digital camera 122 for the purpose of rendering certain images with a 3D effect, such detection can also be used to provide controlling input by the player. For example, and with reference to FIGS. 10A-10C, a feature of the game may display the object and prompt the player to move right or left, up or down, to reveal additional surfaces of the object 1000. If the player leans to the left to reveal left side 1006 as suggested in FIG. 10C, the left side may reveal a bonus or trigger an additional feature. If the player raises their head to reveal the top 1004, a different bonus or feature may be awarded. Bonus combinations may be awarded where the player moves to reveal multiple faces of the object 1000. Additionally or alternatively when the additional views of the object are revealed based upon the detected motion parallax the gaming device processor may be configured to adjust the touch screen interface at the display so that the player can touch a revealed symbol or object to affect an input as described with reference to FIG. 9 below to make a selection or trigger a feature or prize.

Similarly other prompts may be provided to the player which can be responded to by traditional button or touch screen responses by nodding or shaking of the head or movement of the hands or arms. The responsive movement, i.e. gesture, is detected by the digital camera 122, converted to data and processed by the processor to convert the gesture into a response.

Figure 9:
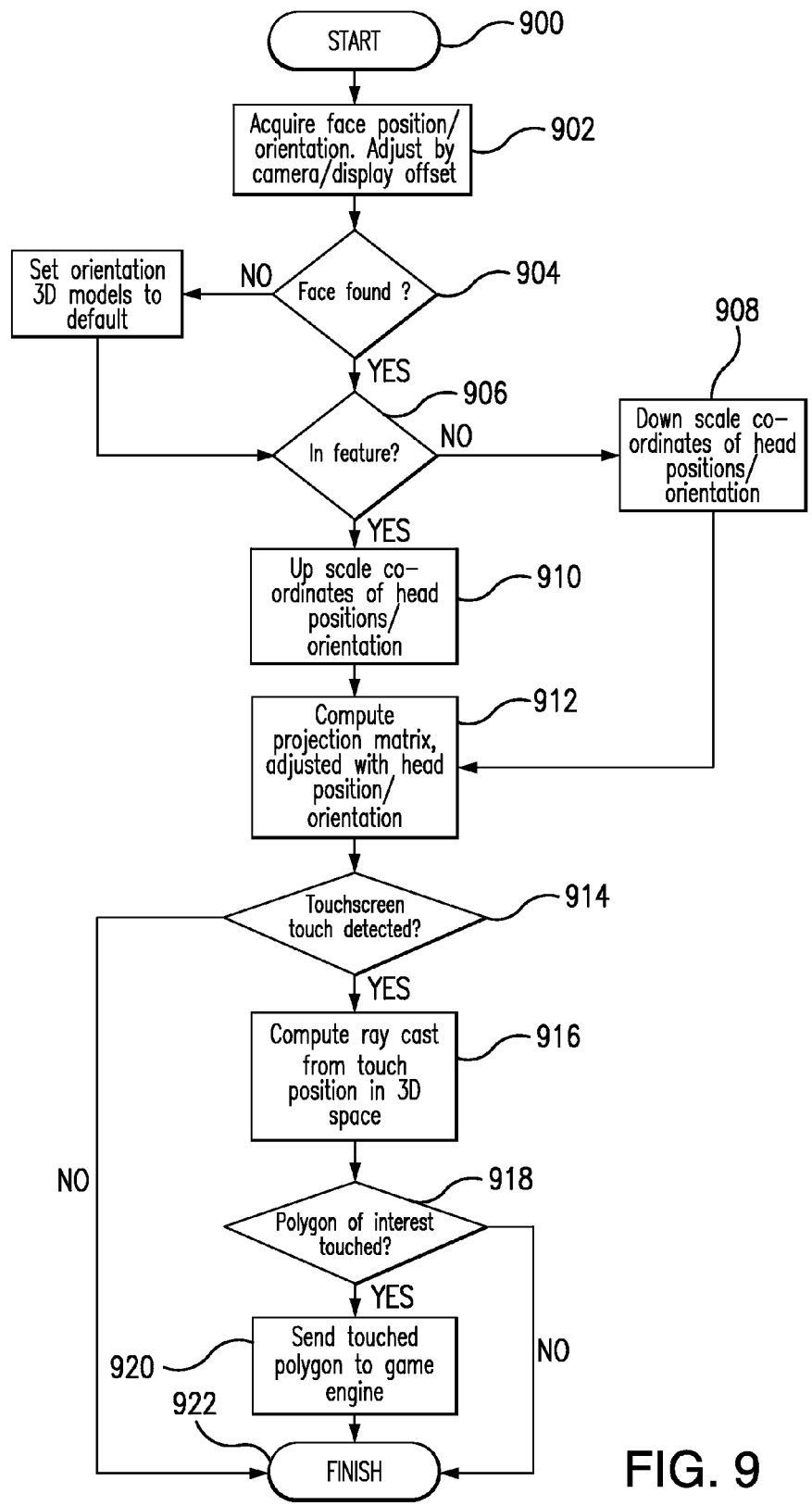
FIG. 9 is a logic diagram of the process to integrate face tracking with touch screen functionality.

FIG. 9 is a logic diagram illustrating incorporating touch screen functionality with games where graphic images are rendered based upon motion parallax. At 900 the process sequence is started such as a player sitting down at a gaming device 100, enabling a wager and starting play. At 902 the digital camera 122 acquires the face position/orientation of the player which is adjusted by any offset such as where the digital camera 122 is to one side of the display or the like. At 904 the software determines if the captured data is the face of the player. If the acquired data does not correspond to a player's face the 3D rendition software modules assume a default state such as assuming a player's face at a default position and orientation. It should be noted that the determination of whether a face has been acquired does not require identification of the player as, for example, "John Smith"; however the data could be used for that purpose. Situations where a face may not be determined to have been acquired may be, for example, a situation where the player's face is outside of the camera's field of view such as where the player is standing or has turned away, or where multiple players are in the field of view and the software cannot determine the position of a single face. At 906 a determination is made as to whether the game state is in a feature where rendition of the graphics based upon motion parallax is desired. For example, the 3D effect described herein may only be provided for certain one or more events or conditions such as a bonus feature, an award event, certain game symbols or graphics, the display of the system interface service window 1304 (FIG. 13B) or the like. Alternatively the effect may be continuous. As a further alternative the effect may be attenuated during certain conditions and accentuated during others. For example, during the base game the motion parallax 3D effect may be attenuated providing only slight to moderate manipulation of the graphics based upon the movement of the player's head. In other circumstances such as in a bonus event the effect may be driven to provide a greater 3D effect. If the game is not in a feature where the motion parallax effect is provided, at 908 the coordinates corresponding to the position for the player's head/orientation are downscaled providing, for example, the attenuated application of the motion parallax effect functionality. If this condition, small movements of the player's head may be ignored and greater movements are required to drive the effect. If the game is in the feature, at 910 the coordinates corresponding to the position for the player's head/orientation are up scaled to accommodate a greater affect based upon lesser movements of the player's head. At 912 the appropriate processor making the computations based upon the head position/orientation and the desired effect based upon motion parallax (be it strictly software driven or driven through lenticular technology as described above) computes the position of the head for example with a frustum extending from the display (or portion of the display) to the player's head.

Continuing with FIG. 9, the game, feature or events may invite a touch screen input to, for example, make a selection. In such a circumstance at 914 a touch screen touch is detected at a location of the touch screen. The position of the touch is computed at 916 taking into account the position/orientation of the player's head as, for example, computing a ray extending from the virtual position of the graphic object/icon touched, the touch screen sensor grid to the player's eyes. Rhodes, U.S. Pat. No. 7,697,751 filed Dec. 29, 2005 and titled "Use of Ray Tracking For Generating Images For Auto-Stereo Displays", the disclosure of which is incorporated by reference, discloses this technique. If the touched position corresponds to an accepted input at 918 the touch inputs is sent at 920 to the game engine and the process is finished at 922. If the touch does not correspond to an accepted input at 918 process is finished at 922 and the player would have to re-touch the touch screen display at 914 to try to enter a proper input. After one or more tries the game engine may invite the player to make a response through other means such as a button, gesture, touch pad, joy stick or the like.

Figure 12:
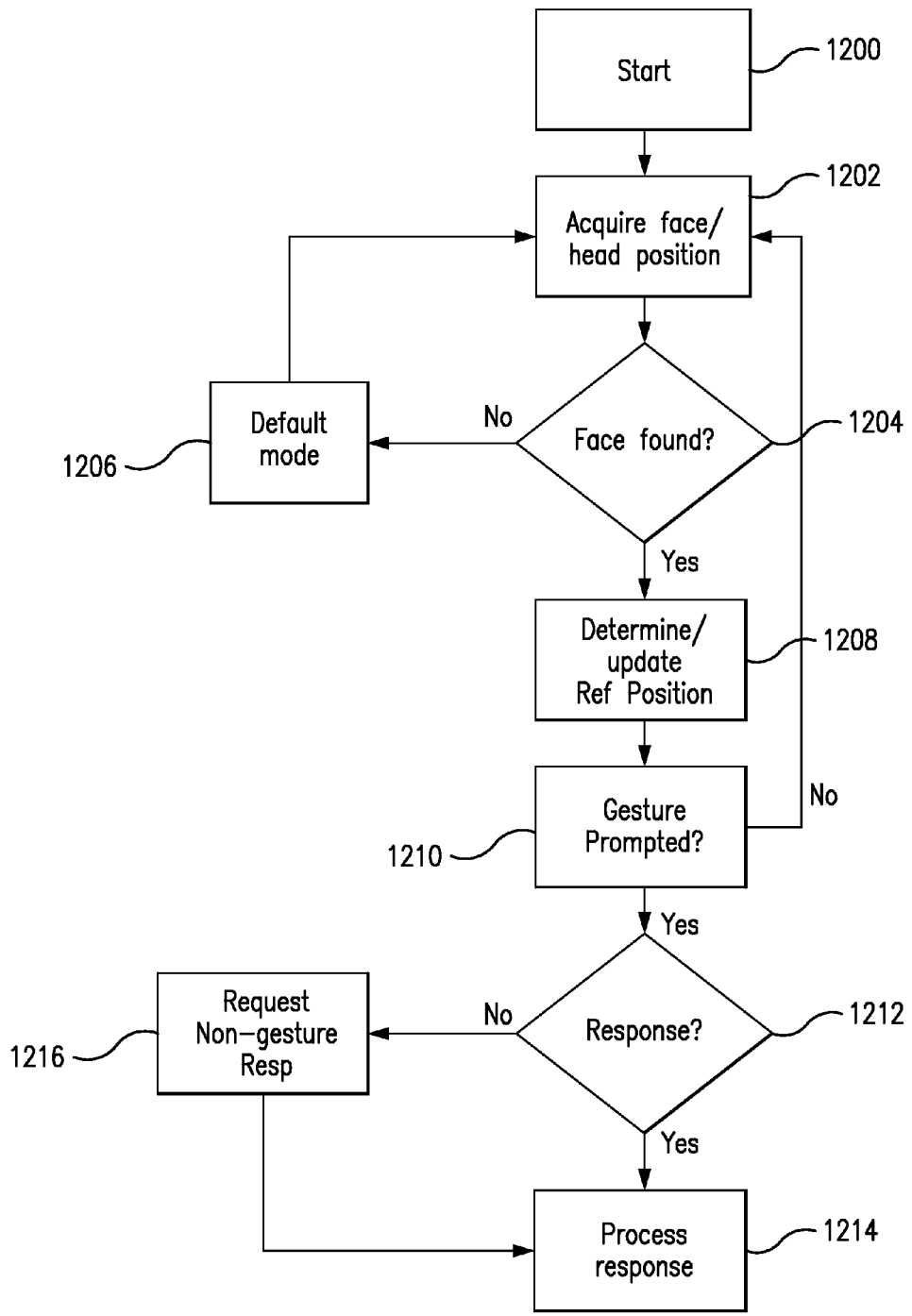
FIG. 12 is a logic diagram of the process for a player to provide input through gestures.

FIG. 12 is a logic diagram for apparatus and methods directed to gesture control as described above. At 1200 the apparatus/process is started. This may occur when a player inserts money or a voucher for gaming at the gaming device 100. The processor at 1202 enables and acquires data from the digital camera 122 to determine the position of the player's head and face. As stated above software such as the faceAPI software may be used for this purpose. Depending upon the nature of the gestures desired to be used as input the digital camera 122 may be configured to also acquire the position of the player's torso and arms. At 1204 the processor analyzes the acquired data to determine if the player's face has been found. If the face is not acquired perhaps as a result of the player moving or temporary environmental lighting conditions or other interference or a malfunction of the digital camera 122, at 1206 the processor is configured to assume a default mode, e.g. assume a condition that the face is located at a default position. The face finding routine is operated on a continuous basis. When a face is found at 1204 at 1208 the processor determines it position (and expression if desired) and uses the acquired position as the new default position. This process is repeated to update the position of the face as the default position. If during the play of the game or other operation of the gaming device 100 a gesture response is prompted at 1210, the processor analyzes the data from the digital camera 122 to determine if the player has made a proper gesture response such as by nodding of the head. If the gesture response is detected at 1212 the response is received as input in response to the prompt at 1214. If the processor at 1212 cannot determine a proper response or in the event confirmation of a proper response is desired the player may be invited at 1216 to make a non-gesture response such as by pushing a button or using a touch screen interface.

An example of the foregoing may be where the player has won an award and is then offered a choice to try to double the award through a display Hi-Lo card selection game. The prompt may be "Do you want to Double Down?" If the player nods their head "Yes" the win amount is staked as a wager and the double down game is played. If the player shakes their head "No", the award is credited and the double down game is declined.

Figure 11A:
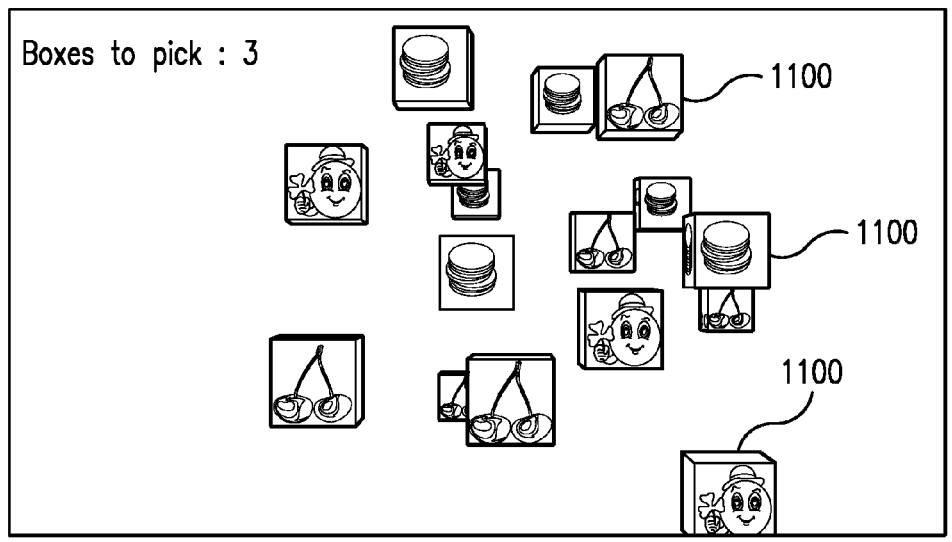
FIGS. 11A-11C illustrate navigation through a field of images controlled by gesture.
Figure 11B:
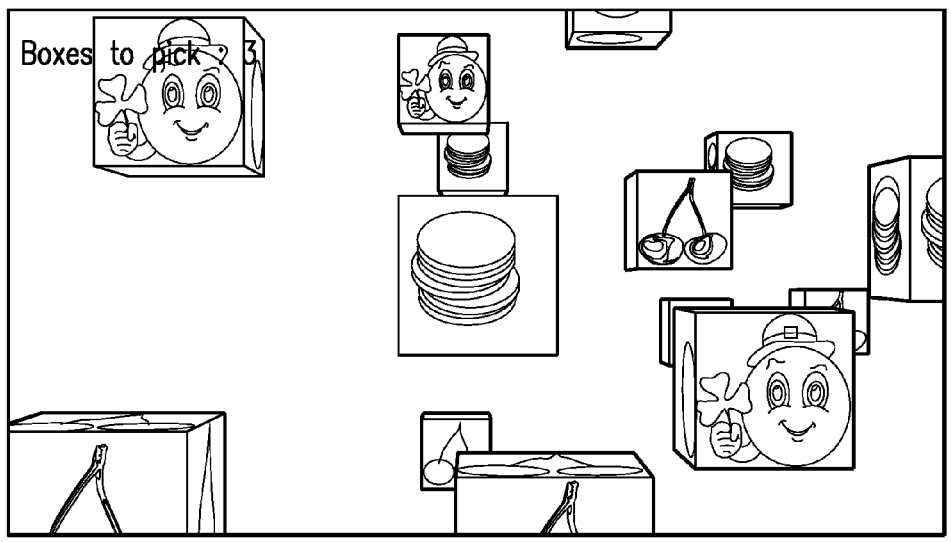
Figure 11C:
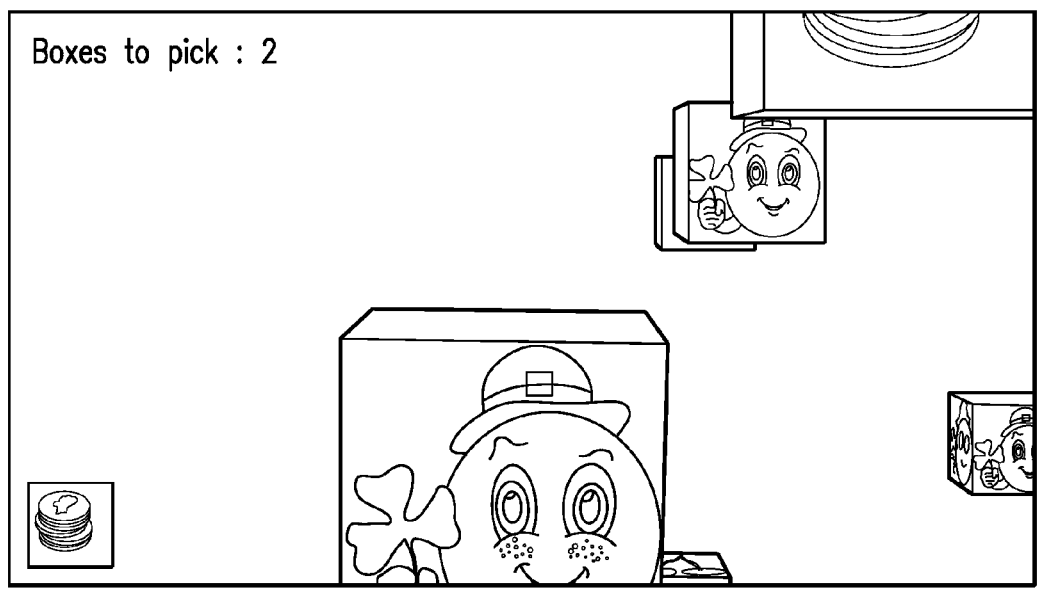

FIGS. 11A-11C illustrate how the rendition of 3D, virtual reality images may be displayed and how gesture control may be used to navigate through a game feature. The gaming device 100 may be configured to offer a base game such as a spinning reel game. Based upon a predetermined condition or event such as the player obtaining certain symbol combinations in the base game, after a certain number of plays, after a certain number of losses or an event randomly triggered internally or externally of the game, the player may be offered to select icons from a field of displayed icons 1100 as shown in FIG. 11A. The processor controls the primary game display 104 to display the icons 1100 moving closer relative to the player, i.e. out of the primary game display 104. The player may navigate through the icons 1100

(and obtain different views of the icons 1100) by moving their head. The movement of the head is detected by the digital camera 122 to navigate the view through the approaching field of icons 1100 perhaps to "home in" on a selected icon 1100 or avoid encountering an icon 1100 to receive a prize, FIG. 11B shows a view of the icons 1100 approaching the player and FIG. 11C shows another view of the navigation through the field through gestures. It should be noted that the gestures could be movement of the head, hands, or torso or a combination. Further, while not highlighted in FIGS. 11A-C the movement of the player may also induce a motion parallax, 3D effect to the icons 1100 further enhancing the experience.

FIGS. 13A-13B illustrate the use of gesture and generation of images based upon motion parallax where a system "service window" 1300 is provides at the primary game display 104. As mentioned above, the player tracking module 110 provides an interface with the backend system 142. In lieu of or in addition to the display 118 at the player tracking module 110, the gaming device 100, player tracking module 110 or backend system 142 may be configured to control the primary game display 104 to size the display of game content 1300 (in this example a video presentation of slot machine reels 1302) to display a system service window 1304 as shown in FIG. 13B. The service window may be provided to impart information to the player such as available promotions, the player's loyalty points and the like. To provide a further effect the service window 1304 may be controlled to provide to the player the 3D, motion parallax effect. By leaning to the right the service window 1304 may appear to extend from the primary game display 104 and may reveal additional features such as touch screen access to other pages such as pages or views behind the service window 1304.

Turning to FIGS. 14A-14B there is shown a further embodiment of the present invention. Gaming devices 1400*a, b* are arranged in a back-to-back arrangement. While shown to be closely adjacent they may be separated by a desired distance. Further the gaming devices 1400*a, b* may be instead arranged side-by-side to produce a similar effect as hereafter described. Gaming devices 1400*a, b* may be of the type described with reference to FIG. 1 of this application and include the same equipment, peripherals, hardware, software, firmware, network connections and functionalities described above. The gaming devices 1400*a, b* may be of similar or different appearance and construction. Each gaming device 1400*a,b* has a cabinet 1402*a, b* supporting a primary game display 1404*a,b* and a secondary display 1406*a,b*. The primary game display 1404*a,b* and secondary display 1406*a,b* may be mechanical or video/mechanical displays such as a window or glass for viewing a number of electro-mechanical stepper reels as is known in the art or employment of a wheel for displaying/selecting either a primary game outcome or a bonus game outcome. In a video embodiment, the primary game display 1404*a* and/or the secondary display 1406*b* is, typically, a CRT or a flat-panel display in the form of, but not limited to, liquid crystal, plasma, electroluminescent, vacuum fluorescent, field emission, laser or any other type of panel display known or developed in the art. Combinations of electromechanical stepper reels and overlaying video displays are also contemplated as one or both of the primary game display 1404*a* and secondary display 1406*b*. Each gaming device 1400*a, b* of this embodiment includes one or more player-activated input devices such as buttons at a button panel 1408*a, b* or a touch screen button panel or by providing touch screen functionality to the primary screen display 1404*a, b* or secondary display 1406*a, b*. As discussed above with respect to the prior embodiments, the gaming devices 1400*a, b* are configured to provide at said displays 1404*a, b* or 1406*a, b* game content as discussed below.

Each gaming device 1400*a, b* includes a digital camera 1410*a, b* disposed to capture data corresponding to a scene 1412*a, b* as viewed from the gaming device 1400*a, b*. In the embodiment shown in FIG. 14 A the digital cameras 1410*a, b* may be located between the primary game display 1404*a, b* and the secondary display 1406*a, b*. In the embodiment of FIG. 14*b* the digital cameras 1410*a, b* may be located behind the primary game display 1404*a, b* or to one side of the primary game display 1404*a, b*. The scene 1412*a, b* may include players as well as the background behind the players. If no players are seated at the gaming machine the scene would be of the background sans a player. Where a player is playing a gaming device 1400*a, b* the data acquired by the digital cameras 1410*a, b* can be used for face position tracking and gesture input as described above. Additionally, and with respect to this embodiment, the gaming devices 1400*a, b* can offer shared community gaming features as hereinafter described.

Figure 16:
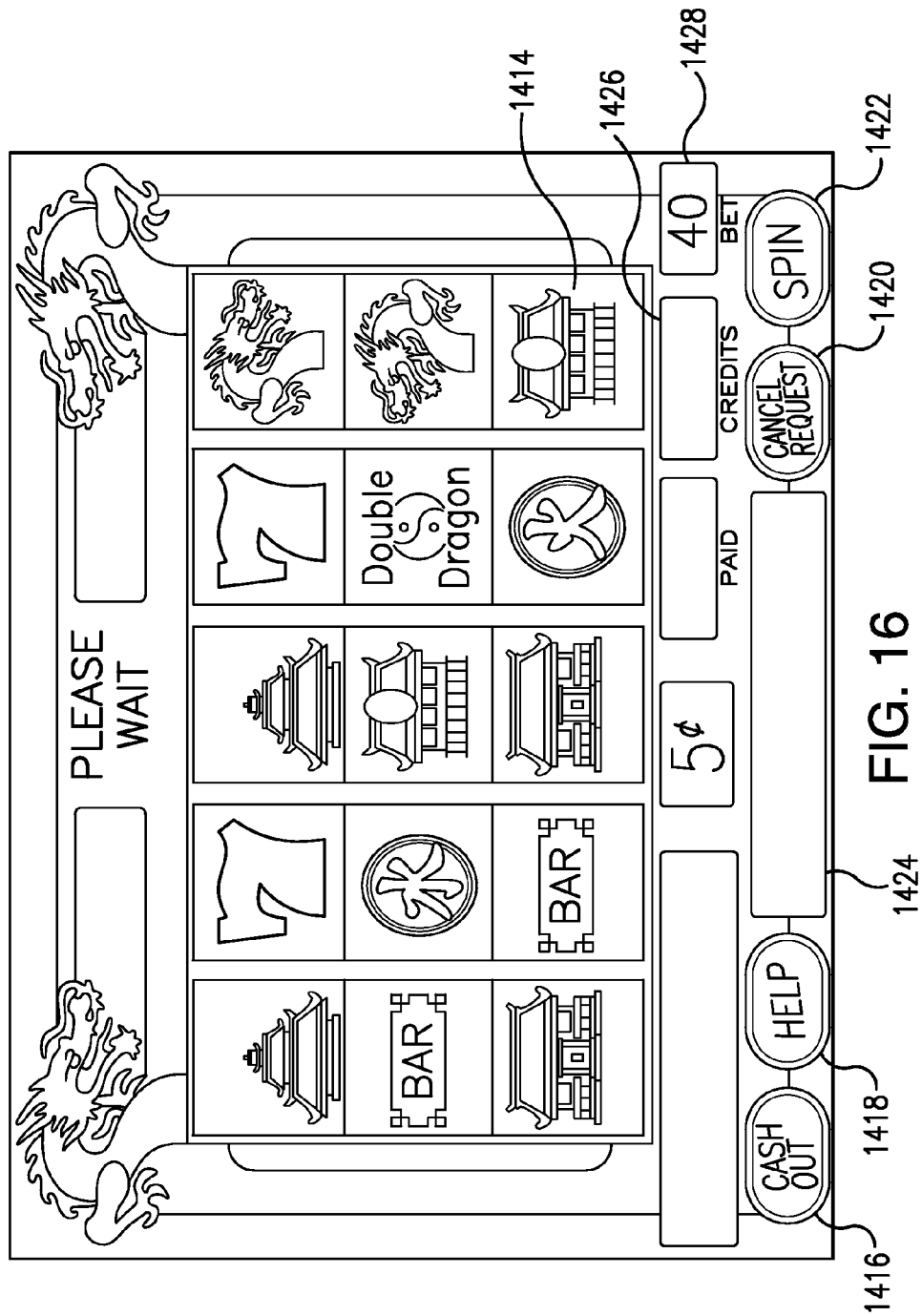
FIG. 16 illustrates the display of a community game.

FIG. 16 provides a view of a display of a game outcome at for example gaming device 1400*a*. The display includes the game matrix 1414 including the outcome game symbols as well as game graphics along the border of the game display. Also displayed are touch screen input button icons such as cash out button 1416, help button 1418, cancel request button 1420 and spin button 1422. Touch screen input button icons of this type are well known in the art. The display also includes the display of various meters such as a paid meter 1424, credits meter 1426 and bet meter 1428. Again meter displays such as those shown in FIG. 16 are will known in the art.

Figure 17:
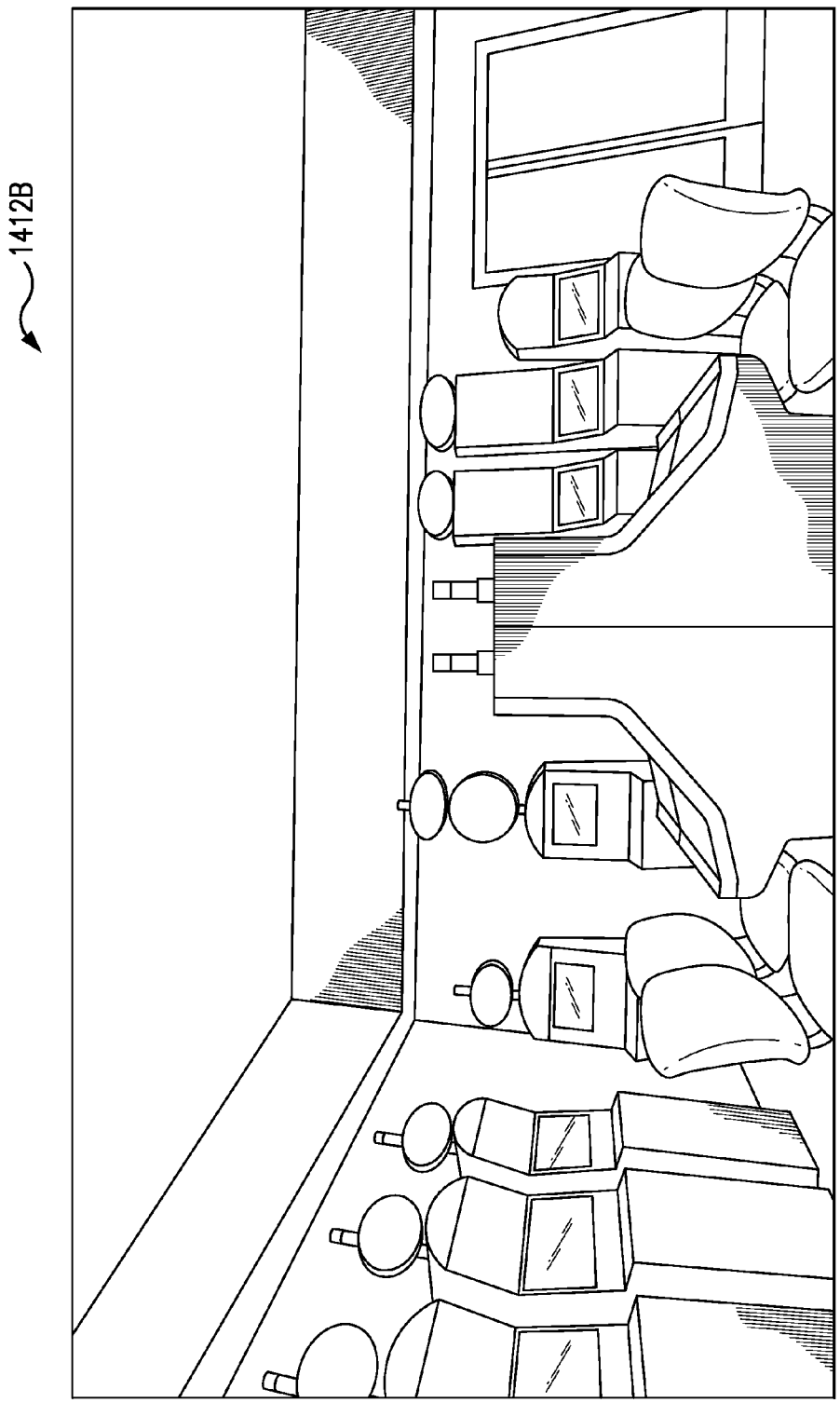
FIG. 17 illustrates a scene captured by digital camera for a gaming device according to this embodiment.

FIG. 17 is a view of a scene 1412*b*, i.e. the view captured by the digital camera 1410*a* of gaming device 1400*a*. As indicated there is no player at the gaming device 1400*b* so the scene is of the background as viewed from the digital camera 1410*b*.

Figure 18:
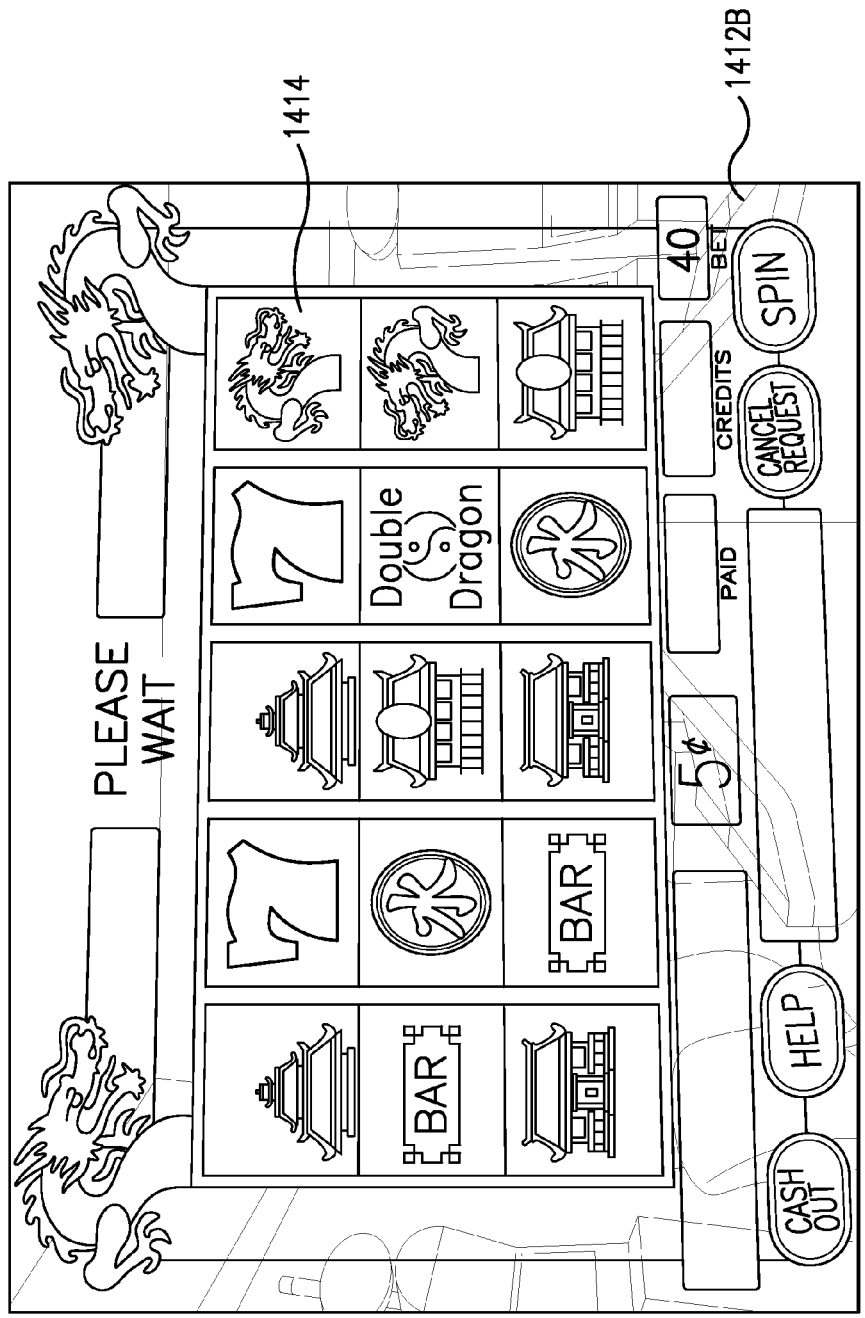
FIG. 18 is a view of the community game event superposed over the FIG. 17 scene images captured by the digital camera.

The play of the gaming devices 1400*a, b* may be as described above, i.e., each gaming device 1400*a, b* operates independently of the other. However, when an event occurs during play which entitles the gaming devices 1400*a, b* to offer a community gaming game certain displays and offerings are triggered. For example, the event may be after players have wagered a qualifying amount and have obtained a qualifying outcome, the community game is triggered. Assuming for purposes of discussing that the player of gaming device 1400*a* has qualified for the community game and a community gaming event has been triggered. In such a case the display of FIG. 18 or FIG. 19 may be triggered. As these displays show, the event includes the superimposition of the gaming content (in FIG. 18 the reels of a video spinning reel game matrix 1414 and in FIG. 19 a matrix 1900 of selections of treasure chest) over the view of the scene 1412*b* as captured by the digital camera 1410*b* (the background scene of gaming device 1400*b* sans a player). It therefore appears to the player of the gaming device 1400*a* that the gaming content is suspended in view through the gaming device 1400*a* to the other side of the gaming device 1400*b*. Where the digital cameras 1410*a,b* are capturing scene images in real time the background will change in real time giving the player of the gaming device 1400*a* the sense that the gaming content is suspended in air between the gaming devices 1400*a,b*. Of course, where a player is likewise at gaming device 1400*b* and it is qualified for the community game, both players would see the gaming content suspended as if suspended between the players and their respective backgrounds.

Figure 19:
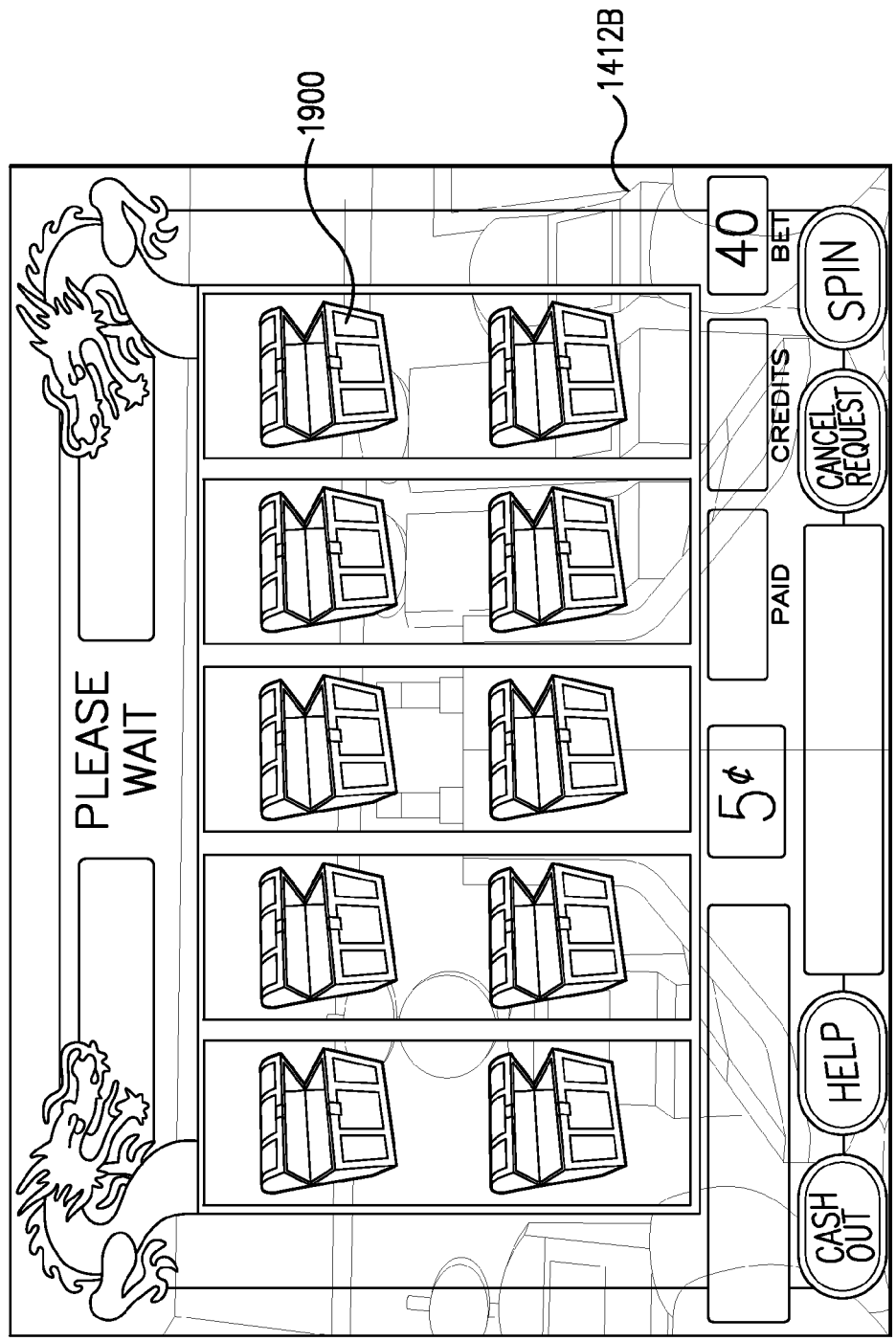
FIG. 19 is a view of a selection game superimposed over scene images.

In one embodiment the community game as between gaming devices 1400a, b may present content in a fashion to highlight the impression that the content is suspended between the players. For example, if both players of the gaming devices 1400a,b are qualified and the player of gaming device 1400a triggers a community gaming event the community game content may be a matrix of selections as shown in FIG. 19. To the player of gaming device 1400a the matrix of selections is a shown. However, for the player of gaming machine 1400b the images or icons are displayed in a reverse image, i.e. mirror image, fashion. As the player of gaming device 1400b watches the player of gaming device 1400a makes selections for the community game which selection are displayed to the player of gaming device 1400a is a positive image and those to the player of the gaming device 1400b in a mirror image. During the player of the community game the digital cameras 1410a, b continue to capture images an update the background images for the content for the players. At the end of the community game, any awards are issued and the gaming devices 1400a, b return to their standard, base game, play state.

Figure 15:
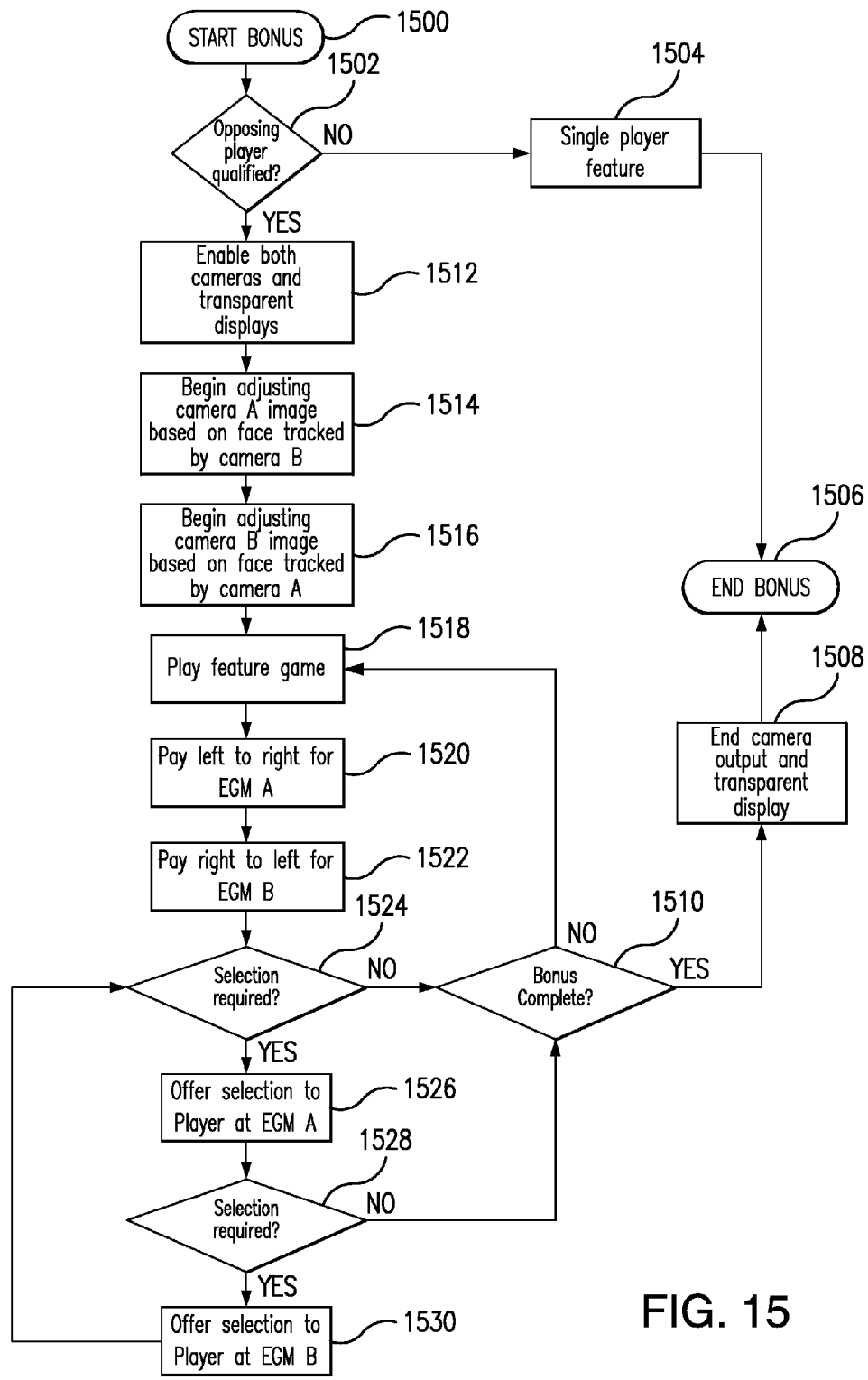
FIG. 15 is a logic diagram related to the offering of a community gaming event for gaming devices.

FIG. 15 is a logic diagram related to the offering of a community gaming event for gaming devices 1400a, b including the features of face tracking manipulation of images and the community gaming superimposition of images as described above. At 1500 the community bonus is started as by being triggered at the gaming device 1400a. At 1502 the system tests to determine whether gaming device 1400b is qualified. If the player of gaming device 1400b is not qualified, at 1504 the system provides a single player game feature such as by displaying a matrix of selection with superimposition over the scene captured by digital camera 1410b but without displaying the game feature to the unqualified player of gaming device 1400b. At 1506 the bonus feature is ended after the player of gaming device 1400a has completed play and at 1508 the generation of the superimposed images is terminated and at 1510 the bonus is ended. If at 1502 the player of gaming device 1400b is also qualified, the superimposition of gaming content over the scene images captured by the digital cameras 1410a, b is enabled at 1512. At 1514 and 1516 the images of the captured background scenes and gaming content is adjusted for, respectively, gaming machines 1400a, b based upon face tracking as described above. The players of gaming devices 1400a, b can move their heads and generate the motion parallax effects for at least the displayed gaming content or for both the gaming content and the background scenes. At 1518 the player of gaming device 1400a plays the feature game. Where, for example, the feature game is a spinning reel game and the game matrix is displayed in a positive orientation to the player of gaming device 1400a and as a mirror image to the player of the gaming device 1400b, at 1520 the player of gaming device 1400a is paid for wins based upon symbol arrangements from left to right and the player of gaming device 1400b is paid at 1522 for the same symbols of the game matrix but on a right to left basis. If at 1524 any selections are required the feature continues; otherwise 1510 the bonus is completed. If selections are offered in the feature at 1524 the player of the gaming device 1400a may make selections at 1526 and if additional selections are offered at 1528 the player of the gaming device 1400b may make one or more selections at 1530. When the selection process, if any, is concluded, the feature is ended at 1510.

The feature of superimposition of the gaming content over scene images as described above can be provided on a routine basis which can be selectively enabled by the player. Further the scene to be used as the background can be imported such as a scene from the restaurant, pool area or any other real time or recorded scene.

Figure 20:
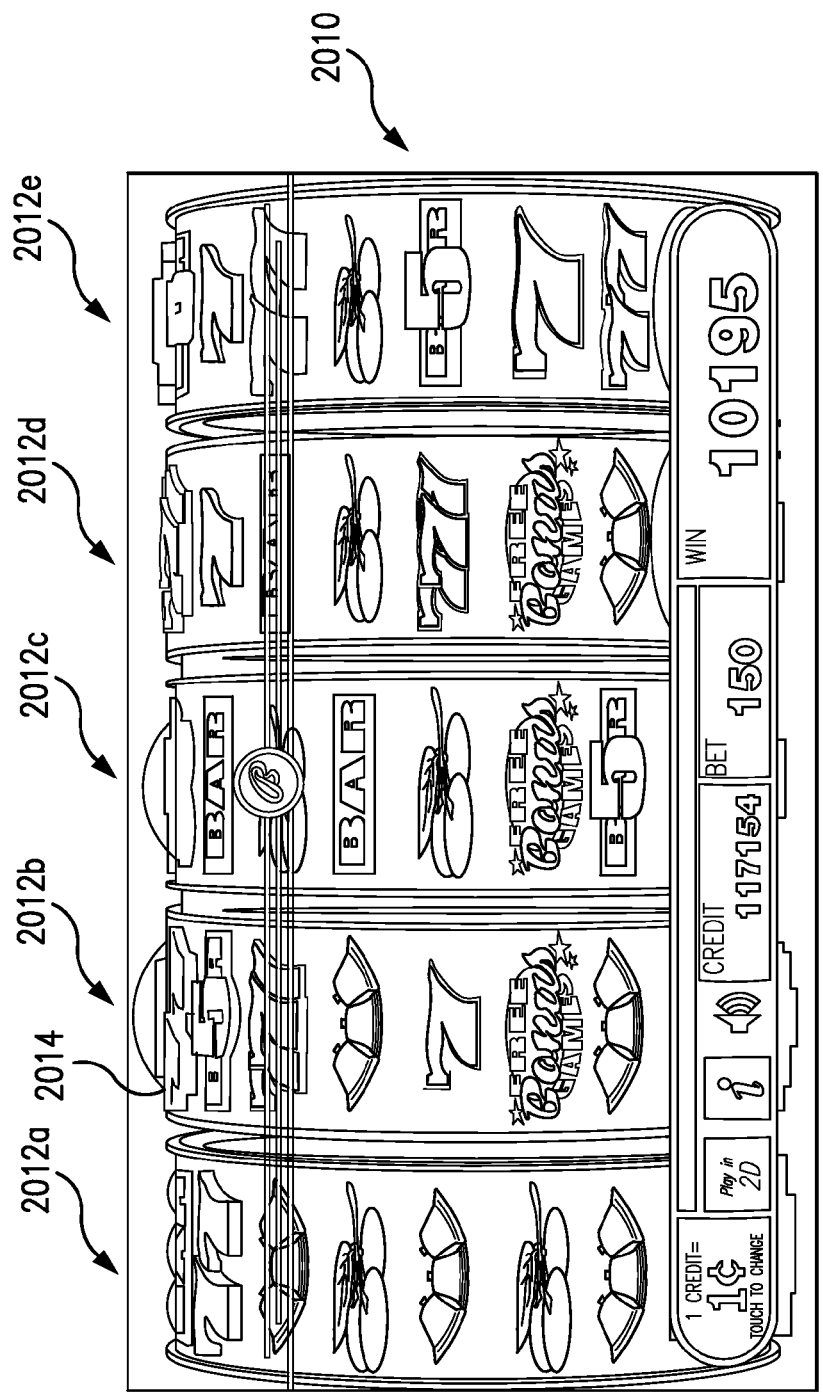
FIG. 20 is a view of a display for a gaming machine showing the application of the effects according to the present invention to show one or more extruded symbols.

Turning to FIGS. 20-24 further features and embodiments of the invention will be described. According to these embodiments selected symbols or image portions may be controlled to provide the 3D, motion parallax effect to enhance those symbols or portions to the player. In one example, as shown, symbols may be accorded the 3D motion parallax effect to appear to the player to extend or "extrude" from the reel strip. FIG. 20 shows a video game display 2010 which includes five reels 2012a-e arranged in a typical side-by-side arrangement simulating mechanical reels. As stated above, the display 2010 may have a selected degree of 3d motion parallax effect applied as suggested in FIGS. 4A-B such that movement of the player's head confers a degree of 3D effect. Additionally one or more symbols such as the "777" symbols 2014 may be displayed to have a lesser or greater 3D greater to appear to the player to extend outward from the reel strip. As the reel strip is displayed to appear to rotate from top to bottom of the display 2010, the effect would be, for example, to the greatest degree near the top and bottom of the display 2010 and attenuated or removed as the 777 symbol 2014 approaches the center of the display 2010. This effect may be applied to a lesser degree to other symbols of the display, symbols that are part of a winning combination, higher pay symbols or other symbols or the applied effect may be related or proportional to the value of the symbol, i.e. the award based upon the symbol. The 3D effect may be intermittently applied to give the symbols the appearance of "pulsing" away from and back into the reel strip. This effect can be applied to other portions of the game such as images in a bonus feature to enhance the display effects. The effect may not be fixed such as it may be based upon factors such as outcomes, anticipated outcomes, bonus features, symbols or graphics introduced into the display 2010 or the like.

Figure 23:
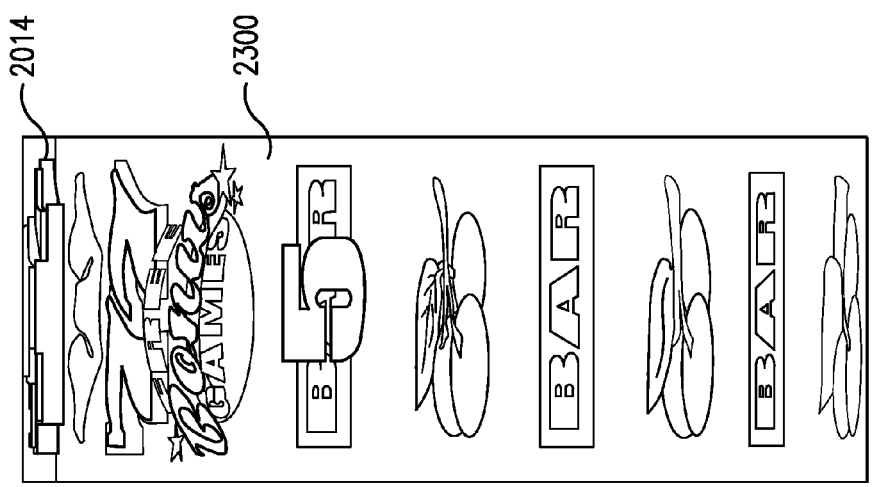
FIG. 23 illustrates a reel strip where the 3D extrusion effect is seen at a symbol at the top of the reel strip.
Figure 24:
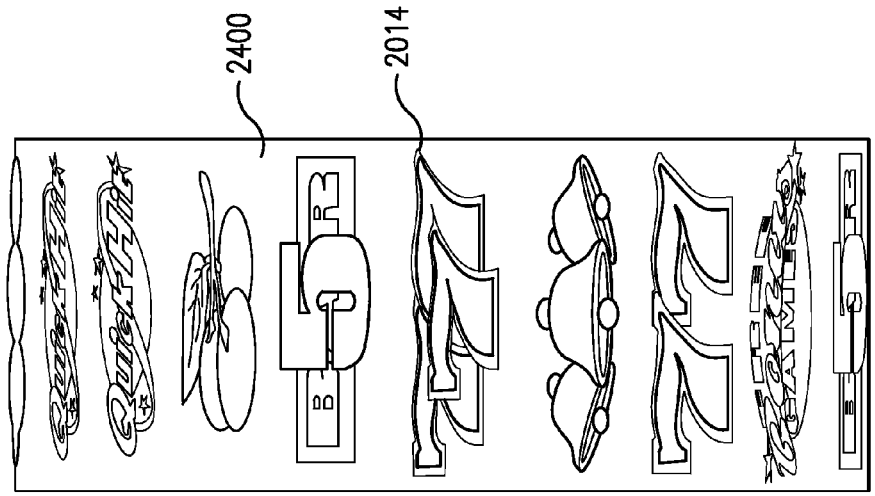
FIG. 24 illustrates the reel strip of FIG. 23 rotated to locate the extruded symbol to a position where the extrusion is not evident.

FIGS. 21A, B show the 777 symbol 2014 when viewed without the effect such as when the 777 symbol 2014 appears in the center of the reel strip 2100. FIGS. 22A, B show the 777 symbol 2014 as it would appear, for example, near the top of the reel strip 2200 with the depth or extruded 3D effect applied by virtue of the 3D face tracking software. FIG. 23 shows the 777 symbol at the top of the reel strip 2300 having a greater extrusion effect applied whereas FIG. 24 shows a reel strip 2400 where the 777 symbol 2014 has no effect applied since the symbol is viewed straight on by the player. It should be understood that if the player moves their head the face tracking software may result in the 777 symbol 2014 exhibiting the 3D effect with other symbols. The 3d effect provided to exhibit the extrusion appearance may be combined with face tracking so that an extruded symbol, as a player moves their head, appears to be a 3D extruded symbol.

Turning to FIG. 25 another feature of the invention is shown. When the gaming machine device 100 is idle or in a condition where the cameras 122 do not detect a player is present for a period of time, e.g. the player is turned around, preferably the system is controlled by the software to use a default (assumed) position of a player's eyes to render the image. This position may be referred to as the virtual camera position, i.e. the position if a camera viewing the image were positioned at the player's eyes. For example, it may be desirable in an attract mode when no player is present, to apply the 3D effects described above, which includes the extrusion effect, to the display to attract players. It has been found, however, than when a player does sit at the gaming device 100 and the cameras 122 first acquire the player's face, there is a jarring discontinuity as the software adjusts from the default position to the actual position of the player's eyes. There is currently a time delay on the order of one second for the software to acquire the player's face and the software adjusts to produce the desired 3D effect. This jarring or discontinuity can be disconcerting and annoying to the players.

To overcome this drawback the present invention according to one or more embodiments applies a smoothing of such discontinuities. According to these various embodiments "Slerp" may be selectively used. 'Slerp' is an animation algorithm developed by Ken Shoemake and a description of the mathematics can be found at, for example, http://en.wikiopedia.org/wiki/Slerp. "Slerp" is an algorithm that interpolates steps between two orientations of an object in a 3D generated scene-be it a virtual model, camera or light. Slerp is useful because it provided for constant speed motion which, when combined with interpolation of position, allows two arbitrary virtual camera positions and orientations to be interpolated between over any given numbers of steps with a pleasing smooth effect.

While Slerp has been used for interpolating virtual cameral orientation in 3D PC and console games, i.e. the orientation of a viewed of the scene, it is believed that is have not been used before the present invention in conjunction with real time face tracking as a means for interpolating between virtual camera orientations because of the problem that Slerp, by its nature, is an interpolation and thus requires two endpoints to interpolate between a number of steps. It has been found that simply using Slerp to interpolate between virtual camera orientations produces a negative effect of adding latency of multiple frames of graphic rendering to the tracking. So while the player sees a smooth change of orientation of the 3D rendition, this change lags behind their head movement at least by one or two frames. This small delay is enough to ruin the 3D effect as the virtual camera no longer accurately reflects the position of the player's eyes. At worst the delay can be nauseating similar to the use of primitive virtual reality headsets that tracked with a similar latency.

To overcome these problems algorithms have been developed to use Slerp for only certain scenarios. Turning to FIG. 25, at 2500 the software is initialized such as at boot up. At 2502 the software determines if a player's face was previously detected. If not at 2504 the images captured by the cameras 122 is interrogated to see if a face is now detected. If no face is detected at 2504, the software controls the display to display at 2506 in a default orientation of the virtual camera, i.e. the player's eyes. This default orientation may be based upon the height of a statistically average sized player. If at 2504 a face is now detected, at 2408 the software slowly interpolates from the default position of the virtual camera to the current orientation as detected in real time by the cameras 122 using Slerp. The interpolation is ideally relatively slow, for example, on the order of one-half second and serves to smoothly introduce the face tracked view of the player. It also compensates for the acquisition time of the face tracking algorithm as the player doesn't see a discontinuous movement of the 3D rendering a few seconds after sitting down at the gaming machine 100. Instead, after a few seconds they have a smooth transition into face tracked 3D.

If at 2502 a face was previously detected at 2510 a determination is made if a face is still detected. If so, at 2512 the difference between the orientations (previous face detection and current face detection) is made. If the differences are small (determined by, for example, known methods such as the dot product between the two orientation quaternions) then no interpolation is used and the current orientation is used as the virtual camera orientation at 2514. This prevents any lag during normal face tracked play. It has been found that a 30 degree facial orientation different between the two image samples may qualify as a small difference. Other values may of course be used.

If at 2512 the difference is not small, such as where the player has looked away, than at 2516 a quick interpolation such as over 2-3 frames can be used. Tracking can still work with as much as a 45 degree variance from a "head on" view of the display.

If at 2510 no face is detected then a timeout period of, for example, ten seconds is initiated. At 2519 the software determines if a face has been re-acquired during the time out period. If at 2518 the time out period is reached with no re-acquisition of a face, then at 2520 a slow interpolation (using Slerp) is used from the previous orientation to the default orientation. If at 2519 before the time out period expires a face is re-acquired at 2522 a quick interpolation (again on the order of 2-3 frames) between the previous and current orientations is used. Ay 2524 the process is finished.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

What is claimed is:

1. A gaming device for play of an electronic wagering game comprising:
   a processor;
   an auto-stereo electronic display;
   an apparatus configured to generate data corresponding to a relative position of at least a portion of a body of a user of the gaming device relative to the auto-stereo electronic display, said relative position changeable during operation of the gaming device; and
   a memory storage device configured to store instructions which, when executed by the processor, cause the gaming device to perform operations to:
   (a) receive said data from said apparatus,
   (b) determine, based on the data received from the apparatus, the relative position of the at least the portion of the body of the user relative to the auto-stereo electronic display,
   (c) render a first auto-stereo image of a first symbol of a slot reel and a second auto-stereo image of a second, different symbol of the slot reel at said auto-stereo electronic display in connection with said electronic wagering game based upon motion parallax associated with the relative position of the at least the portion of the body of the user of the gaming device relative to the auto-stereo electronic display, and (d) as the slot reel spins, display:
(i) at a center of a rendered portion of the slot reel, said first auto-stereo image of the first symbol with a first degree of three-dimensional motion parallax effect which causes the first symbol to appear to extrude from the slot reel; and
(ii) at a top or bottom of the rendered portion of the slot reel, said second auto-stereo image of the second symbol with a second degree of three-dimensional motion parallax effect which causes the second symbol to appear to extrude from the slot reel, wherein:
(A) the second degree of three-dimensional motion parallax effect is greater than the first degree of three-dimensional motion parallax effect; and
(B) the first symbol and the second symbol are displayed concurrently during a same game play round of the electronic wagering game.

2. The gaming device of claim 1, wherein the apparatus includes a camera.

3. The gaming device of claim 1, wherein the auto-stereo electronic display includes a touch screen interface.

4. The gaming device of claim 1, wherein the memory storage device is further configured to store instructions, which when executed by the processor cause the gaming device to perform operations to:
use the first degree of three-dimensional motion parallax effect for a first gaming feature associated with the first auto-stereo image of the first reel symbol; and
use the second degree of three-dimensional motion parallax effect for a second gaming feature associated with the second auto-stereo image of the first reel symbol.

5. The gaming device of claim 4, wherein the first gaming feature is a primary play feature of the electronic wagering game and wherein the second gaming feature is one or more of a bonus feature, an award feature, and a service feature.

6. The gaming device of claim 4, wherein the first gaming feature reveals a game element that is unavailable for the second gaming feature.

7. The gaming device of claim 6, wherein the game element responds to a touch input via a touch screen interface of the auto-stereo electronic display.

8. The gaming device of claim 7, wherein the memory storage device is further configured to store instructions that when executed by the processor cause the gaming device to perform operations to:
adjust, as the relative position of the at least portion of the body of the user changes with movement, a position of the game element according to the second degree of three-dimensional motion parallax effect; and
adjust, as the position of the game element is adjusted, a touch input control to a location on the auto-stereo electronic display that corresponds to the position of the game element.

9. A method for controlling a gaming device for play of an electronic wagering game, the method comprising:
generating, by an apparatus, data corresponding to a relative position of at least a portion of a body of a user of the gaming device relative to an auto-stereo electronic display, wherein the relative position is changeable during operation of the gaming device;
receiving, by one or more processors, the data from the apparatus;
determining, by the one or more processors based on the data received from the apparatus, the relative position of the at least the portion of the body of the user relative to the auto-stereo electronic display,
rendering, by the one or more processors, a first auto-stereo image of a first symbol of a slot reel and a second auto-stereo image of a second, different symbol of the slot reel at said auto-stereo electronic display in connection with said electronic wagering game based upon motion parallax associated with the relative position of the at least the portion of the body of the user of the gaming device relative to the auto-stereo electronic display, and
as the slot reel spins, display via the one or more processors:
at a center of a rendered portion of the slot reel, said first auto-stereo image of the first symbol with a first degree of three-dimensional motion parallax effect which causes the first symbol to appear to extrude from the slot reel; and
at a top or bottom of the rendered portion of the slot reel, the second auto-stereo image of the second symbol with a second degree of three-dimensional motion parallax effect which causes the second symbol to appear to extrude from the slot reel, wherein:
the second degree of three-dimensional motion parallax effect is greater than the first degree of three-dimensional motion parallax effect; and
the first symbol and the second symbol are displayed concurrently during a same game play round of the electronic wagering game.

10. The method of claim 9, wherein the apparatus includes a camera.

11. The method of claim 9, wherein the auto-stereo electronic display includes a touch screen interface.

12. The method of claim 9 further comprising:
using, via the one or more processors, the first degree of three-dimensional motion parallax effect for a first gaming feature associated with the first auto-stereo image of the first reel symbol; and
using, via the one or more processors, the second degree of three-dimensional motion parallax effect for a second gaming feature associated with the second auto-stereo image of the first reel symbol.

13. The method of claim 12, wherein the first gaming feature is a primary play feature of the electronic wagering game and wherein the second gaming feature is one or more of a bonus feature, an award feature, and a service feature.

14. The method of claim 12, wherein the first gaming feature reveals a game element that is unavailable for the second gaming feature.

15. The method of claim 14, wherein the game element responds to a touch input via a touch screen interface of the auto-stereo electronic display.

16. A non-transitory machine-readable medium including instructions that, when executed by a processor, control a gaming device to play an electronic wagering game, instructions comprising:
instructions to generate, by an apparatus, data corresponding to a relative position of at least a portion of a body of a user of the gaming device relative to an auto-stereo electronic display, wherein the relative position is changeable during operation of the gaming device;
instructions to receive, by one or more processors, the data from the apparatus;
instructions to determine, by the one or more processors based on the data received from the apparatus, the relative position of the at least the portion of the body of the user relative to the auto-stereo electronic display;
instructions to render, by the one or more processors, a first auto-stereo image of a first symbol of a slot reel and a second auto-stereo image of a second, different symbol of the slot reel at said auto-stereo electronic display in connection with said electronic wagering game based upon motion parallax associated with the relative position of the at least the portion of the body of the user of the gaming device relative to the auto-stereo electronic display; and as the slot reel spins, instructions to display via the one or more processors:

at a center of a rendered portion of the slot reel, said first auto-stereo image of the first symbol with a first degree of three-dimensional motion parallax effect which causes the first symbol to appear to extrude from the slot reel; and at a top or bottom of the rendered portion of the slot reel, the second auto-stereo image of the second symbol with a second degree of three-dimensional motion parallax effect which causes the second symbol to appear to extrude from the slot reel, wherein:

the second degree of three-dimensional motion parallax effect is greater than the first degree of three-dimensional motion parallax effect; and the first symbol and the second symbol are displayed concurrently during a same game play round of the electronic wagering game.

17. The non-transitory machine-readable medium of claim 16, wherein the apparatus includes a camera.

18. The non-transitory machine-readable medium of claim 16, wherein the auto-stereo electronic display includes a touch screen interface.

* * * * *